(12) United States Patent
Gonen

(10) Patent No.: US 10,185,922 B2
(45) Date of Patent: *Jan. 22, 2019

(54) METHODS AND SYSTEM FOR MANAGING RECYCLING OF RECYCLABLE MATERIAL

(75) Inventor: Ron Gonen, New York, NY (US)

(73) Assignee: RECYCLEBANK LLC, New York, NY (US)

( * ) Notice: Subject to any disclaimer, the term of this patent is extended or adjusted under 35 U.S.C. 154(b) by 1472 days.

This patent is subject to a terminal disclaimer.

(21) Appl. No.: 11/854,387

(22) Filed: Sep. 12, 2007

(65) Prior Publication Data

US 2008/0059970 A1   Mar. 6, 2008

Related U.S. Application Data

(63) Continuation-in-part of application No. 11/345,867, filed on Feb. 2, 2006, now Pat. No. 7,949,557.

(60) Provisional application No. 60/825,383, filed on Sep. 12, 2006, provisional application No. 60/650,610, filed on Feb. 7, 2005.

(51) Int. Cl.
     *G06Q 10/06* (2012.01)

(52) U.S. Cl.
     CPC .................. *G06Q 10/06* (2013.01)

(58) Field of Classification Search
     USPC ...................................... 705/1, 1.1
     See application file for complete search history.

(56) References Cited

U.S. PATENT DOCUMENTS

| | | |
|---|---|---|
| 4,248,334 A | 2/1981 | Hanley et al. |
| 4,949,528 A | 8/1990 | Palik |
| 5,035,564 A | 7/1991 | Matsumoto |
| 5,072,833 A | 12/1991 | Hansen et al. |
| 5,209,312 A | 5/1993 | Jensen |
| 5,209,361 A | 5/1993 | Grubb, Jr. |
| 5,230,393 A | 7/1993 | Mezey |
| 5,237,507 A | 8/1993 | Chasek |

(Continued)

FOREIGN PATENT DOCUMENTS

| | | |
|---|---|---|
| JP | 13-195496 A | 7/2001 |
| JP | 2001312551 | 9/2001 |

(Continued)

OTHER PUBLICATIONS

PCT/ISA/220, "Notification of Transmittal of the International Search Report . . . ", for PCT/US2007/079440, dated Apr. 23, 2008, (3 pgs).

(Continued)

*Primary Examiner* — Douglas W Owens
*Assistant Examiner* — Laura Yesildag
(74) *Attorney, Agent, or Firm* — John Maldjian; Maldjian Law Group LLC

(57) ABSTRACT

A method and system for managing a recycling entity is included. The method includes obtaining entity data associated with at least one entity. The at least one entity is operable to recycle a quantifiable measure of recyclable material. The method also includes obtaining resource data associated with resources associated with carrying out recycling, applying the entity data and the resource data to a model for determining an allocation of the resources so as to form at least one record, and generating, as a function of the at least one record, reports for allocating the resources.

18 Claims, 20 Drawing Sheets

(56) References Cited

U.S. PATENT DOCUMENTS

| | | | |
|---|---|---|---|
| 5,251,761 A | 10/1993 | Hansen et al. | |
| 5,251,944 A | 10/1993 | Truitt | |
| 5,304,744 A | 4/1994 | Jensen | |
| 5,333,984 A | 8/1994 | Bayne et al. | |
| 5,355,987 A | 10/1994 | DeWoolfson et al. | |
| 5,416,279 A | 5/1995 | Tseng | |
| 5,425,456 A | 6/1995 | Erikson | |
| 5,447,017 A | 9/1995 | Becher et al. | |
| 5,484,246 A | 1/1996 | Horning et al. | |
| 5,628,412 A | 5/1997 | Hulls | |
| 5,699,525 A * | 12/1997 | Embutsu ............... G06Q 10/06 235/376 | |
| 5,704,558 A * | 1/1998 | Arrott ........................... 241/47 | |
| 5,712,990 A | 1/1998 | Henderson | |
| 5,833,429 A | 11/1998 | McNeilus et al. | |
| 5,837,945 A | 11/1998 | Cornwell et al. | |
| 5,842,652 A | 12/1998 | Warsing et al. | |
| 5,871,114 A | 2/1999 | Anderson et al. | |
| 5,923,016 A | 7/1999 | Fredregill et al. | |
| 5,934,867 A | 8/1999 | Christenson | |
| 5,960,402 A | 9/1999 | Embutsu et al. | |
| 5,965,858 A | 10/1999 | Suzuki et al. | |
| 5,983,198 A | 11/1999 | Mowery et al. | |
| 6,026,370 A | 2/2000 | Jermyn | |
| 6,055,573 A | 4/2000 | Gardernswartz et al. | |
| 6,292,785 B1 | 9/2001 | McEvoy et al. | |
| 6,496,804 B2 | 2/2002 | McEvoy et al. | |
| 6,448,898 B1 | 9/2002 | Kasik | |
| 6,663,004 B2 | 12/2003 | Wagner et al. | |
| 6,664,897 B2 | 12/2003 | Pape et al. | |
| 6,718,343 B2 | 4/2004 | Kamata | |
| 6,952,625 B2 | 10/2005 | Uetake et al. | |
| 6,993,712 B2 | 1/2006 | Ramachandran et al. | |
| 7,032,820 B2 | 4/2006 | Kreiner et al. | |
| 7,133,895 B1 | 11/2006 | Lee et al. | |
| 7,134,084 B1 | 11/2006 | Rashid et al. | |
| 7,136,865 B1 | 11/2006 | Ra et al. | |
| 7,167,836 B2 | 1/2007 | Gottslig et al. | |
| 7,251,620 B2 | 7/2007 | Walker et al. | |
| 7,267,262 B1 | 9/2007 | Brown | |
| 7,313,602 B2 | 12/2007 | Ono et al. | |
| 7,398,225 B2 | 7/2008 | Voltmer et al. | |
| 7,398,226 B2 | 7/2008 | Haines et al. | |
| 7,398,248 B2 | 7/2008 | Phillips et al. | |
| 7,424,441 B2 | 9/2008 | George et al. | |
| 7,428,498 B2 | 9/2008 | Voltmer et al. | |
| 7,496,524 B2 | 2/2009 | Voltmer et al. | |
| 7,689,682 B1 | 3/2010 | Eldering et al. | |
| 7,999,688 B2 | 8/2011 | Healey et al. | |
| 8,138,923 B2 | 3/2012 | Grunwald et al. | |
| 2001/0047299 A1 | 11/2001 | Brewer et al. | |
| 2002/0026326 A1 | 2/2002 | Stevens | |
| 2002/0040564 A1 | 4/2002 | Killingbeck et al. | |
| 2002/0082920 A1 | 6/2002 | Austin et al. | |
| 2002/0188509 A1 | 12/2002 | Ariff et al. | |
| 2002/0188511 A1 | 12/2002 | Johnson et al. | |
| 2003/0040854 A1 | 2/2003 | Rendahl et al. | |
| 2003/0055723 A1 | 3/2003 | English | |
| 2003/0065610 A1 | 4/2003 | Brown et al. | |
| 2003/0065661 A1 | 4/2003 | Brown et al. | |
| 2003/0115097 A1 | 6/2003 | Sokei et al. | |
| 2003/0139981 A1 | 7/2003 | Mizuno et al. | |
| 2003/0158818 A1 | 8/2003 | George et al. | |
| 2003/0233278 A1 | 12/2003 | Marshall | |
| 2004/0049424 A1 | 3/2004 | Murray et al. | |
| 2004/0083216 A1 | 4/2004 | Kozam et al. | |
| 2004/0143355 A1 | 7/2004 | Uetake et al. | |
| 2004/0167799 A1 | 8/2004 | Berry | |
| 2004/0199401 A1 | 10/2004 | Wagner et al. | |
| 2004/0199545 A1 | 10/2004 | Wagner et al. | |
| 2004/0200689 A1 | 10/2004 | Compton et al. | |
| 2004/0243468 A1 | 12/2004 | Cohagan et al. | |
| 2005/0027597 A1 | 2/2005 | Peterson | |
| 2005/0038572 A1 * | 2/2005 | Krupowicz ........... B65F 1/1484 700/305 | |
| 2005/0043963 A1 | 2/2005 | Soga et al. | |
| 2005/0059849 A1 | 3/2005 | Liu | |
| 2005/0080520 A1 | 4/2005 | Kline et al. | |
| 2005/0131757 A1 | 6/2005 | Chan et al. | |
| 2005/0192963 A1 * | 9/2005 | Tschiegg et al. ................. 707/9 | |
| 2005/0256767 A1 | 11/2005 | Friedman | |
| 2005/0273340 A1 | 12/2005 | Yamamoto | |
| 2006/0069588 A1 | 3/2006 | Ritter | |
| 2006/0080819 A1 | 4/2006 | McAllister | |
| 2006/0178933 A1 * | 8/2006 | FitzGerald et al. ............ 705/14 | |
| 2006/0224450 A1 | 10/2006 | Moon | |
| 2006/0253407 A1 | 11/2006 | Waddell et al. | |
| 2006/0271423 A1 | 11/2006 | Hiranoya | |
| 2006/0273180 A1 | 12/2006 | Ammond et al. | |
| 2007/0038511 A1 | 2/2007 | Hytken | |
| 2007/0100694 A1 | 5/2007 | Kopps | |
| 2007/0102506 A1 | 5/2007 | Stevens | |
| 2007/0112632 A1 | 5/2007 | Voltmer et al. | |
| 2007/0174073 A1 | 7/2007 | Hunscher et al. | |
| 2007/0219862 A1 | 9/2007 | Casella et al. | |
| 2007/0260466 A1 | 11/2007 | Casella et al. | |
| 2007/0291323 A1 | 12/2007 | Roncal | |
| 2008/0041996 A1 | 2/2008 | Shaw et al. | |
| 2008/0061124 A1 | 3/2008 | Langlois et al. | |
| 2008/0061125 A1 | 3/2008 | Langlois et al. | |
| 2008/0069641 A1 | 3/2008 | Kreiner et al. | |
| 2008/0077498 A1 | 3/2008 | Ariff et al. | |
| 2008/0077499 A1 | 3/2008 | Ariff et al. | |
| 2008/0086411 A1 | 4/2008 | Olson et al. | |
| 2008/0169342 A1 | 7/2008 | Gonen et al. | |
| 2008/0183634 A1 | 7/2008 | Sadler | |
| 2008/0208721 A1 * | 8/2008 | Bertogg ......................... 705/35 | |
| 2008/0275772 A1 | 11/2008 | Suryanarayana et al. | |
| 2008/0320139 A1 | 12/2008 | Fukuda et al. | |
| 2009/0125402 A1 | 5/2009 | Voltmer et al. | |
| 2009/0132641 A1 | 5/2009 | Sanguinetti et al. | |
| 2009/0138358 A1 | 5/2009 | Gonen et al. | |
| 2009/0228405 A1 | 9/2009 | Lopez et al. | |
| 2009/0228406 A1 | 9/2009 | Lopez et al. | |

FOREIGN PATENT DOCUMENTS

| | | |
|---|---|---|
| JP | 2002-073896 A2 | 3/2002 |
| JP | 2002-297840 | 10/2002 |
| JP | 2003099520 | 4/2003 |
| JP | 2005-008339 | 1/2005 |
| KR | 1020020084880 A | 11/2002 |
| KR | 1020080008694 A | 1/2008 |
| KR | 1020080013246 A | 2/2008 |

OTHER PUBLICATIONS

PCT/ISA/210, "International Search Report", for PCT/US2007/079440, dated Apr. 23, 2008, (3 pgs).

PCT/ISA/237, "Written Opinion of the International Searching Authority", for PCT/US2007/079440, dated Apr. 23, 2008, (5 pgs).

Form PCT/ISA/220, "Notification of Transmittal of the International Search Report . . . ", dated Jun. 16, 2009 for PCT/US2009/031129, (4 Pgs).

From PCT/ISA/237, "Written Opinion of the International Searching Authority", dated Jun. 16, 2009 for PCT/US2009/031129, (6 Pgs).

Form PCT/ISA/210, "International Search Report", dated Jun. 16, 2009 for PCT/US2009/031129, (4 Pgs).

Intl' Search Report and Written Opinion for PCT/2008/055687 dated Aug. 20, 2008, 9 pages.

Intl' Search Report and Written Opinion for PCT/2008/055689 dated Jul. 17, 2008, 10 pages.

Intl' Search Report and Written Opinion for PCT/2008/074647 dated Mar. 25, 2009, 8 pages.

Intl' Search Report and Written Opinion for PCT/2009/042812 dated Dec. 21, 2009, 10 pages.

Intl' Search Report and Written Opinion for PCT/2010/021757 dated Aug. 31, 2010, 9 pages.

Intl' Search Report and Written Opinion for PCT/2010/025993 dated Oct. 29, 2010, 11 pages.

(56) References Cited

OTHER PUBLICATIONS

Intl' Search Report and Written Opinion for PCT/2009/042801 dated Nov. 30, 2009, 15 pages.
World Economic Forum Names RecycleBank a 2009 Technology Pioneer found at http://Corporate.Recyclebank.com/press-release . . . Dec. 4, 2008, 4 pages.
Peretsman, Natalie, "Rewarding Recycling," Scienceline, Jun. 12, 2008, (5 pgs.).
Colimore, Edward, "Cherry Hill Starts Cashing in on Recycling," The Philadelphia Inquirer, Jun. 30, 2008, (2 pgs.).
Hays, Julia, "Hauler: New Recycling Program Runs Smoothly," Courier-Post, Jul. 1, 2008, (2 pgs.).
It's Easy Being Green: It Pays to Recycle, Center for American Progress, Jul. 16, 2008, (2 pgs.).
Satullo, Chris, "The Right Kind of 'Nudge' Improves Life for Citizens," The Philadelphia Inquirer, Jul. 20, 2008, (2 pgs.).
Glick, Alexis, "Talking Trash . . . Literally," The Glick Report, Fox Business, Jul. 31, 2008 (1 pg.).
Judkis, Maura, "4 Ways to Earn Cash for Recycling," U.S. News & World Report, Jul. 30, 2008, (2 pgs.).
Knoblauch, Jessica A., "Turning Your Trash Into Cash," Plenty Magazine, (3 pgs.).
Siegel, Robert, "What's Behind a Patchwork of Recycling Rules?" NPR, Jul. 28, 2008, (3 pgs.).
Laidler, John, "Residents Find Recycling Has Its Just Reward," The Boston Globe, Jul. 27, 2008, (2 pgs.).
Jones, Charisse, "Residents Reap Rewards for Recycling," USA Today, Jul. 9, 2008, (3 pgs.).
Wong, Wylie, "Going Green," Biztech Magazine, Mar. 2008, found at http://www.biztechmagazine.com/article.asp?itemjd=397, (4 pgs.).
Walsh, Bryan, "Making Recycling Really Pay," Time Magazine, Apr. 11, 2008, found at http://time.com/time/health/article/0,8599,1730187,00.html?xid=rss-health, (2 pgs.).
Gunther, Marc, "Turning Trash Into Cash," Fortune Magazine, Sep. 20, 2007, found at http://money.cnn.com/2007/09/20/magazines/fortune/recyclebankfortune/index.htm, (3 pgs.).
"Bags to Riches," Good Magazine, Mar./Apr. 2007, (1 pg.).
Desimone, Bonnie, "Rewarding Recyclers, and Finding Gold in the Garbage," The New York Times, Feb. 21, 2006, found at http://www.nytimes.com/2006/02/21/business/businessspecial/21recycle.html?_r=2&ore, (3 pgs.).
4 Ways to Earn Cash for Recycling, U.S. News & World Report, Jul. 31, 2008, (2 pgs.).
Special Report: RecycleBank Set for the UK? Letsrecycle.com, Jul. 25, 2008, (4 pgs.).
New 'American Scrap Coalition' Will Address Global Trade Barriers, Reuters, Jun. 12, 2008, (2 pgs.).
"Technology Pioneers 2009," World Economic Forum, (36 pgs.).
Desai, Anuj et al., "The Plenty 20 Awards for 2008," (4 pgs.).
Jenny Mero, "Wasteful Thinking," Fortune Magazine, Apr. 2008, (1 pg.).
Gonen, "EP Application No. EP08747881.4, European Search Report dated Mar. 18, 2011", Publisher: EPO, Published in: EP, 9 pages.
Wolff et al., "GB Application No. GB1104976.4, Examiner Report dated Oct. 21, 2011", Publisher: IPO.UK, Published in: GB, 2 pages.
*Card Verification Solutions* vs. *Citigroup Inc*, patent infringement suit against U.S. Pat. No. 5,826,245, United States District Court for the Northern District of Illinois Eastern Division, Case No. 13C6339, Judge Virginia M. Kendall, Sep. 29, 2014, 11 pages.

\* cited by examiner

FIG. 3A

REPORTS CAN BE RUN ON THE VARIETY OF DATA IN THE SYSTEM. REPORTS CAN EITHER BE RUN GLOBALLY OR CAN BE RUN WITHIN A SINGLE MUNICIPALITY, ROUTE, ZIP CODE, OR STREET.

REPORTS CAN BE GENERATED AT ANY TIME OR AT REGULAR TIME INTERVALS SUCH AS WEEKLY, MONTHLY OR YEARLY.

SINGLE USER REPORT:

PURPOSE: DISPLAYS THE RECYCLING HISTORY AND EARNINGS OF AN INDIVIDUAL USER, AS WELL AS THE USER'S ORDER ACTIVITY.

DESCRIPTION: THE SINGLE USER REPORT DISPLAYS CURRENT AS WELL AS PAST RECYCLING DATA FOR AN INDIVIDUAL USER. DATA INCLUDES: CURRENT BALANCE, RecycleBank DOLLARS EARNED THIS MONTH, TOTAL TIME RECYCLED, AVERAGE WEIGHT PER COLLECTION, AVERAGE TIMES RECYCLED PER MONTH, AND REPORT DATA RANGE. IT INCLUDES THE USER'S RECYCLING HISTORY, WITH RECORDS OF EARNINGS ON DATES RECYCLED. THE REPORT ALSO INCLUDES A USER'S ORDER HISTORY, WITH DATES AND CONTENTS OF EACH ORDER.

FULL USER REPORT:

PURPOSE: DISPLAYS THE RECYCLING HISTORY OF A GROUP OF USERS.

DESCRIPTION: THE FULL USER REPORT CAN BE GENERATED BY COLLECTION ROUTE, ZIP, STREET, AND ROUTE, DATA INCLUDES: ACCOUNT NUMBER, RFID#, USER ADDRESS, NUMBER OF TIMES RECYCLED, MONTHLY RECYCLING RATE, AVERAGE WEIGHT PER COLLECTION, WEIGHT OF MOST RECENT COLLECTION, AND CURRENT BALANCE.

SINGLE VENDOR REPORT:

PURPOSE: DISPLAYS A LIST OF USERS THAT HAVE USED THEIR RecycleBank DOLLARS TO SHOP AT A PARTICULAR VENDOR.

DESCRIPTION: THE SINGLE VENDOR REPORT IS GENERATED FOR EACH INDIVIDUAL VENDOR. THE REPORT DISPLAYS THE ACTIVITY ASSOCIATED BETWEEN INDIVIDUAL USERS AND A SELECTED VENDOR. THE DATA INCLUDES: USER ADDRESS, CITY, STATE, ZIP, REWARDS ORDERED (FROM SELECTED VENDOR), DATE OF FIRST ORDER, DATE OF LAST ORDER, AND PERCENTAGE OF RecylceBank DOLLARS USED AT VENDOR. THE REPORT CAN BE GENERATED BY COLLECTION ROUTE, ZIP, OR BY STREET.

*FIG. 3B*

VENDOR REPORT:

PURPOSE: DISPLAYS HOW A COLLECTIVE GROUP OF HOMES HAVE USED THEIR RecycleBank DOLLARS.

DESCRIPTION: THE VENDOR REPORT CAN BE GENERATED BY COLLECTION ROUTE, ZIP, OR BY STREET. ESSENTIALLY, THE REPORT DISPLAYS THE MOST POPULAR VENDORS FOR A SELECTED GROUP OF USERS. AS A SPREADSHEET, DATA FROM THE REPORT INCLUDES: COUPON PERCENTAGE, VENDOR NAME, COUPON COUNT, AND TOTAL RecycleBank DOLLARS.

VENDOR REPORT (GRAPH):

PURPOSE: DISPLAYS HOW A GROUP OF HOMES HAVE USED THEIR RecycleBank DOLLARS.

DESCRIPTION: THE VENDOR REPORT (GRAPH) CAN BE GENERATED BY COLLECTION ROUTE, ZIP, OR BY STREET FOR ALL VENDORS IN THE SYSTEM. THE REPORT ILLUSTRATES THE MOST POPULAR VENDORS FOR A SELECTED GROUP OF USERS OR IN THE ENTIRE SYSTEM. AS A BAR GRAPH, THE REPORT DISPLAYS VENDORS ON THE Y-AXIS AND COUPON PERCENTAGE ON THE X-AXIS.

MONTHLY OVERVIEW REPORT:

PURPOSE: DISPLAY PARTICIPATION RATES AND OF A GROUP OF USERS IN A GIVEN TIME PERIOD.

DESCRIPTION: THE MONTHLY OVERVIEW REPORT CAN BE GENERATED BY HAULER, COLLECTION ROUTE, ZIP, OR BY STREET. DATA IS PRESENTED IN THE FORM OF FOUR SERIES OF BAR GRAPHS, THE *FIRST* ILLUSTRATES PARTICIPATION RATES FOR THE PAST 4 WEEKS. THE *SECOND* ILLUSTRATES WEEKLY PARTICIPATION RATES, DISPLAYING PERCENTAGES OF PARTICIPATING USERS FOR ALL WEEKS IN THE SYSTEM. THE *THIRD* ILLUSTRATES A MONTHLY OVERVIEW, DISPLAYING PARTICIPATING USERS BY AVERAGE WEIGHT ON A MONTHLY BASIS. THE *FOURTH* ILLUSTRATES WEEKLY AVERAGE AND MEDIAN WEIGHT RECYCLED FOR USERS.

FIG. 3C

MONTHLY ROUTE OVERVIEW REPORT

PURPOSE: DISPLAYS DETAILED INFORMATION ON THE STREETS THAT COMPRISE A PARTICULAR COLLECTION ROUTE.

DESCRIPTION: THE MONTHLY ROUTE OVERVIEW REPORT CAN BE GENERATED BY HAULER OR COLLECTION ROUTE. DATA IS PRESENTED IN THE FORM OF FOUR SERIES OF BAR GRAPHS. THE *FIRST* ILLUSTRATES MONTHLY (4 WEEK VIEW) PARTICIPATION RATES BY STREET. THE *SECOND* ILLUSTRATES MONTHLY (4 WEEK VIEW) HOUSEHOLD WEIGHTS BY STREET, SHOWING THE AVERAGE AMOUNT RECYCLED BY EACH HOUSEHOLD (FROM THAT STREET) EACH MONTH. THE *THIRD* ILLUSTRATES THE WEEKLY PARTICIPATION RATE FOR EACH STREET. THE *FOURTH* ILLUSTRATES THE AVERAGE WEIGHT RECYCLED BY EACH HOUSEHOLD (FROM THAT STREET) EACH WEEK.

HAULER OVERVIEW REPORT:

PURPOSE: DISPLAYS A MONTHLY OVERVIEW AND WEEKLY RECYCLING REPORT INCLUDING WEIGHT RECYCLED AND PARTICIPATION RATE.

DESCRIPTION: THE HAULER OVERVIEW REPORT CAN BE GENERATED FROM THE LIST OF HAULERS. DATA IS PRESENTED IN THE FORM OF FOUR SERIES OF BAR GRAPHS. THE *FIRST* ILLUSTRATES THE PARTICIPATION RATE FOR THE PAST FOUR WEEKS. THE *SECOND* ILLUSTRATES PARTICIPATION RATES ON THE WEEKLY BASIS. THE *THIRD* ILLUSTRATES A MONTHLY OVERVIEW, DISPLAYING WEIGHTS BY HOUSEHOLD. THE *FOURTH* ILLUSTRATES WEEKLY AVERAGE OF WEIGHT RECYCLED, DISPLAYING THE AVERAGE WEIGHTS RECYCLED ON A WEEKLY BASIS.

ANALYSIS OF RECYCLING AND PARTICIPATION RATES:

PURPOSE: TO ANALYZE THE PERFORMANCE OF RECYCLING AND PARTICPATION RATES BY CATEGORIZING USERS AS LOW, AVERAGE, TOP, AND STRONG RECYCLERS.

DESCRIPTION: THE ANALYSIS OF RECYCLING AND PARTICIPATION RATES REPORT CAN BE GENERATED FROM THE LIST OF COLLECTION ROUTES. PARTICIPATION AND RECYCLING DATA IS ORGANIZED INTO QUADRANT TABLES FOR EASIER REFERENCE. EACH QUADRANT (LOW, AVERAGE, TOP, AND STRONG) PROVIDES A CLEAR SEGMENTATION OF PERFORMANCE THAT ENABLES OUTREACH ACTIVITIES TO BE MORE DIRECT AND SPECIFIC.

*FIG. 3D*

DAILY REPORT OF RecycleBank REWARDS ORDERED:

PURPOSE: DISPLAYS THE CURRENT LIST OF RecycleBank REWARDS ORDERED.

DESCRIPTION: THE DAILY REPORT OF RecycleBank REWARDS ORDERED REPORT DISPLAYS THE CURRENT LIST OF RecycleBank REWARDS THAT HAVE BEEN ORDERED, AND HAVE YET TO BE SHIPPED. THIS REPORT IS USED ON A DAILY BASIS TO PROCESS THE ORDERS FOR SHIPMENT. AS A SPREADSHEET, THE REPORT INCLUDES: ORDER NUMBER, ACCOUNT NUMBER, ADDRESS, COUPON ORDERED, AND DATE ORDERED.

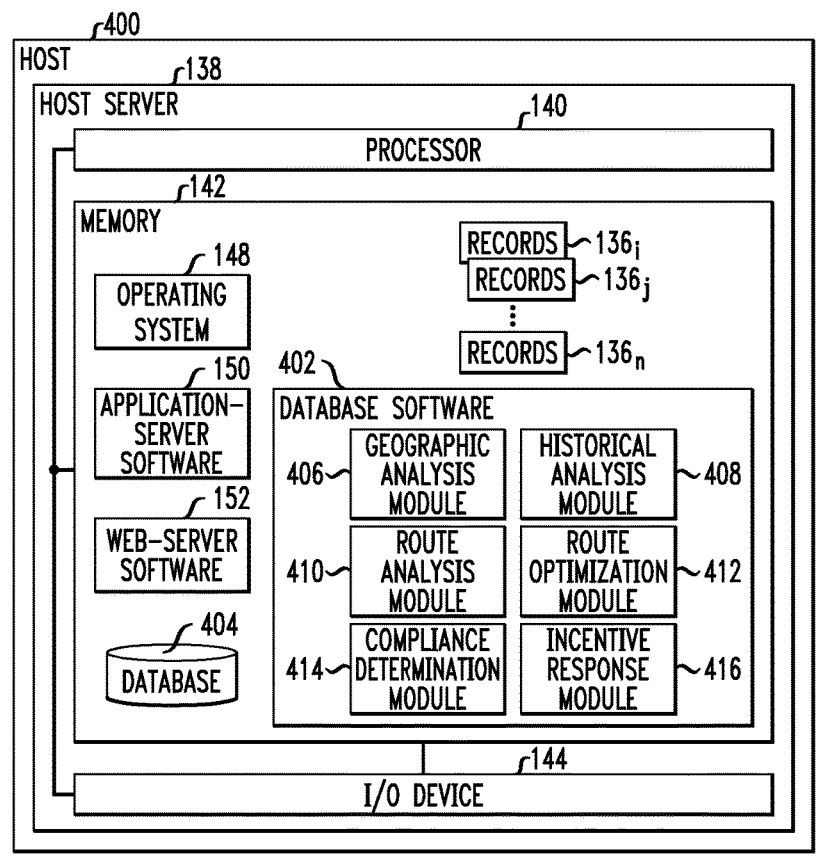

| # | DATA-TYPE NAME | INPUT | OUTPUT |
|---|---|---|---|
| 1 | REPORT_DATA_MONTHLY_OVERVIEW | x | x |
| 2 | SYSTEM_RULES | x | x |
| 3 | SYSTEM_ALERTS | x | x |
| 4 | CAMPAIGN_STATUS | 66 | 6 |
| 5 | DOCUMENT_ITEM_JN | x | x |
| 6 | DOCUMENT | 5 | x |
| 7 | CAMPAIGN_TYPE | 66 | x |
| 8 | ADMINISTRATOR_ROLE | 11 | 66, 50 |
| 9 | CAMPAIGN_VENDOR_JN | x | 8, 46 |
| 10 | EVENT | x | x |
| 11 | ADMINISTRATOR_ADMINISTRATOR_ROLE_JN | x | 46, 50 |
| 12 | ADMINISTRATOR_VENDOR_JN | x | x |
| 13 | URL_DIRECT | x | 50 |
| 14 | REPORT_DATA_MONTHLY_STREET_OVERVIEW | x | 50, 48 |
| 15 | VENDOR_EXTRANET_LOGIN | x | 66, 40 |
| 16 | VENDOR_COLLECTION | x | 40, 50 |
| 17 | CAMPAIGN_MUNICIPALITY_JN | x | 20, 50 |
| 18 | MUNICIPALITY_VENDOR_JN | x | x |
| 19 | VENDOR_VENDOR_TYPE_JN | x | |
| 20 | VENDOR_TYPE | 19 | |

FIG. 7A cont.

| | | | | |
|---|---|---|---|---|
| 21 | DELIVERY_EXTRANET | | x | 25 |
| 22 | ADMINISTRATOR_MUNICIPALITY_JN | | x | 46, 40 |
| 23 | CONTACT_MUNICIPALITY_JN | | x | 62, 62 |
| 24 | FEATURED_PARTNER | | x | 40 |
| 25 | DELIVERY | | 21 | 50, 29 |
| 26 | CommunityGroup | | 43 | 40 |
| 27 | MUNICIPALITY_PIPELINE_EXTENDED | | x | 40 |
| 28 | ASSET | | x | 40 |
| 29 | REWARD_TYPE | | 25, 30 | x |
| 30 | REWARD | | x | 32, 34, 50, 25, 29 |
| 31 | UserAccount_Login | | x | 34 |
| 32 | ORDER | | 30 | 34 |
| 33 | CONTACT_UserAccount_JN | | x | 34, 62 |
| 34 | UserAccount | | 33, 53, 36, 31, 30, 32, 51 | 48, 37, 40, 44 |
| 35 | UserAccount_Full_VW | | x | 40, 48 |
| 36 | Subscription_UserAccount_JN | | x | 34, 54 |

*FIG. 7B*

| | | | |
|---|---|---|---|
| 37 | DISPLAY_STATUS | 34, 35, 44, 38, 50, 40, 39 | x |
| 38 | HAULER_FULL_VW | x | 37, 48 |
| 39 | VENDOR_FULL_VW | x | 37, 48 |
| 40 | MUNICIPALITY | 18, 22, 23, 41, 17, 24, 26, 27, 34, 53, 28, 35, 52 | 46, 47 |
| 41 | HAULER_MUNICIPALITY_JN | x | 40, 44 |
| 42 | ADMINISTRATOR_ACTIVITY | x | 46 |
| 43 | CommunityGroup_Contact_JN | x | 26, 62 |
| 44 | HAULER | 47, 41, 63, 34, 58, 54, 59, 65 | 46, 48, 37 |
| 45 | ACTIVITY_VENDOR_JN | x | 50, 57 |
| 46 | ADMINISTRATOR | 63, 57, 66, 11, 64, 12, 50, 40, 42, 22, 55, 44, 56, 60 | x |
| 47 | CONTACT_HAULER_JN | x | 62, 44 |
| 48 | ADDRESS | 49, 16, 50, 38, 39, 44, 34, 35, 62 | x |
| 49 | CONTACT_FULL_VW | x | 48 |
| 50 | VENDOR | 61, 12, 15, 16, 9, 25, 18, 19, 30, 45 | 46, 37, 48 |
| 51 | ACTIVITY_UserAccount_JN | x | 57, 34 |
| 52 | ACTIVITY_MUNICIPALITY_JN | x | 57, 40 |
| 53 | PICKUP | x | 59, 34, 40 |
| 54 | SUBSCRIPTION | 34 | 44 |
| 55 | ACTIVITY_TYPE_ADMINISTRATOR_JN | x | 56, 46 |
| 56 | ACTIVITY_TYPE | 55, 57 | 46 |
| 57 | ACTIVITY | 51, 60, 45, 58, 52 | 56, 46 |
| 58 | ACTIVITY_HAULER_JN | x | 57, 44 |

FIG. 7B cont.

| | | | |
|---|---|---|---|
| 59 | TRUCK | 53 | 44 |
| 60 | ADMINISTRATOR_ACTIVITY_JN | x | 57, 46 |
| 61 | CONTACT_VENDOR_JN | x | 62, 50 |
| 62 | CONTACT | 61, 43, 47, 23, 33 | 48 |
| 63 | ADMINISTRATOR_HAULER_JN | x | 44, 46 |
| 64 | ADMINISTRATOR_CAMPAIGN_JN | x | 46, 66 |
| 65 | CAMPAIGN_HAULER_JN | x | 44, 66 |
| 66 | CAMPAIGN | 9, 17, 65, 64 | 4, 7, 46 |

*FIG. 7C cont.*

Administrator_Administrator_Role_JN (704₁₁)
- id
- date_updated
- date_created
- FK1 administrator_id
- FK2 administrator_role_id

Administrator_Vendor_JN (704₁₂)
- id
- FK1 administrator_id
- FK2 vendor_id

Url_Redirect (704₁₃)
- id
- url_suffix
- description
- foreign_table
- foreign_key
- date_updated
- date_created

Report_Data_Monthly_Street_Overview (704₁₄)
- id
- week_of
- municipality_id
- hauler_id
- route_id
- zip
- street
- total_weight
- min_weight
- max_weight
- total_rb_dollars
- median_weight
- participating_user_count
- user_count
- participation_rate
- average_weight_by_participating_users
- average_weight_by_users
- date_created

Vendor_Extranet_Login (704₁₅)
- id
- FK1 vendor_id
- username
- password
- coupon_mask
- date_last_logged_in
- date_updated
- date_created

Vendor_Collection (704₁₆)
- id
- collection_method
- collection_method_number
- service_level
- price
- date_updated
- date_created
- FK2 vendor_id
- FK3 address_id
- FK1 hauler_id

Campaign_Municipality_JN (704₁₇)
- id
- FK2 campaign_id
- FK1 municipality_id

Municipality_Vendor_JN (704₁₈)
- id
- FK2 vendor_id
- FK1 municipality_id
- sort

Vendor_Vendor_Type_JN (704₁₉)
- id
- FK2 vendor_id
- FK1 vendor_type_id
- sort
- date_created

FIG. 7D

704₂₀ Vendor_Type
- id
- name
- sort
- date_updated
- date_created
- x_vendor_category_id

704₂₁ Delivery_Extranet
- FK1 id
- delivery_id
- use_logo
- terms
- short_description
- default_url
- original_codes
- is_authorized
- date_updated
- date_created

704₂₂ Administrator_Municipality_JN
- id
- FK2 administrator_id
- FK1 municipality_id

704₂₃ Contact_Municipality_JN
- id
- FK2 municipality_id
- FK1 contact_id

704₂₄ Featured_Partner
- id
- name
- description
- website_url
- is_featured
- date_updated
- date_created
- FK1 municipality_id

704₂₅ Delivery
- id
- FK1 vendor_id
- FK2 reward_type_id
- is_online
- quantity
- price
- notes
- monthly_usage_cap
- date_delivered
- date_updated
- date_created
- x_delivery_id

704₂₆ CommunityGroup
- id
- FK1 municipality_id
- name
- description
- date_updated
- date_created

704₂₇ Municipality_Pipeline_Extended
- id
- FK1 municipality_id
- previous_waste_generated
- previous_waste_recycled
- landfill_tons
- landfill_tipping_fee
- wte_tons
- wte_tipping_fee
- has_compost_program
- compost_program_description
- has_yard_waste_program
- yard_waste_program_description
- has_ewaste_program
- ewaste_program_description

704₂₈ Asset
- id
- FK1 municipality_id
- is_closed
- name
- carts_currently
- carts_needed
- carts_pipeline
- carts_35_ordered
- carts_64_ordered
- carts_96_ordered
- carts_35_used
- carts_64_used
- carts_96_used
- date_delivery_carts
- date_next_carts
- scale_currently
- scale_trucks
- scale_needed
- scale_pipeline
- date_delivery_scale
- date_next_scale
- date_next_retrofit
- date_updated
- date_created

*FIG. 7E*

704_29 Reward_Type
- id
- name
- date_updated
- date_created
- x_coupon_denomination_id

704_30 Reward
- id
- FK2 user_id
- FK5 reward_type_id
- FK3 vendor_id
- FK1 delivery_id
- FK4 order_id
- sku
- price
- online_code
- date_used
- date_updated
- date_created
- x_coupon_id

704_31 UserAccount_Login
- id
- date_logged_in
- FK1 useraccount_id

704_32 Order
- id
- FK1 user_id
- status
- notes
- date_ordered
- date_shipped
- date_updated
- date_created
- x_order_id

704_33 Contact_UserAccount_JN
- id
- FK2 useraccount_id
- FK1 contact_id

704_34 UserAccount
- id
- FK3 municipality_id
- FK4 hauler_id
- FK1 address_id
- acct_number
- acct_number_short
- username
- password
- route_id
- container_size
- comments
- date_started
- balance
- date_last_login
- FK2 display_status_id
- pipeline
- subscribe_recyclebank_offers
- subscribe_other_offers
- date_updated
- date_created
- x_user_id

704_36 Subscription_UserAccount_JN
- id
- FK2 user_id
- FK1 subscription_id

704_37 Display_Status
- id
- name
- description
- is_active
- is_viewable
- is_listed
- date_updated
- date_created

704_35 UserAccount_Full_VW
- id
- FK2 municipality_id
- FK1 address_id
- acct_number
- acct_number_short
- username
- password
- route_id
- comments
- date_started
- balance
- FK3 display_status_id
- pipeline
- date_updated
- date_created
- x_user_id
- street1
- street2
- city
- state
- province
- zip
- country

704_38 Hauler_Full_VW
- id
- FK1 address_id
- name
- num_subscriptions
- num_trucks
- pipeline
- FK2 display_status_id
- date_updated
- date_created
- street1
- street2
- city
- state
- province
- zip
- country

*FIG. 7F cont.*

Activity — 704₅₇

- id
- FK1 activity_type_id
- child_activity_type_id
- FK2 administrator_id
- FK3 assigned_by_id
- date_submitted
- date_resolved
- date_due
- title
- description
- resolution
- is_closed
- foreign_table
- date_updated
- date_created

Activity_Hauler_JN — 704₅₈

- id
- FK2 activity_id
- FK1 hauler_id

Truck — 704₅₉

- id
- FK1 hauler_id
- number
- date_retrofitted
- comments
- date_updated
- date_created
- x_truck_id

Administrator_Activity_JN — 704₆₀

- id
- FK1 administrator_id
- FK2 activity_id

Contact_Vendor_JN — 704₆₁

- id
- FK2 vendor_id
- FK1 contact_id
- sort
- date_created

Contact — 704₆₂

- id
- FK1 address_id
- first_name
- middle_name
- last_name
- company
- title
- type
- prefix
- suffix
- phone
- mobile
- fax
- email
- notes
- is_primary
- date_updated
- date_created
- x_contact_id

Administrator_Hauler_JN — 704₆₃

- id
- FK2 administrator_id
- FK1 hauler_id

Administrator_Campaign_JN — 704₆₄

- id
- FK1 administrator_id
- FK2 campaign_id

Campaign_Hauler_JN — 704₆₅

- id
- FK1 campaign_id
- FK2 hauler_id

Campaign — 704₆₆

- id
- FK1 administrator_id
- FK3 campaign_type_id
- FK2 campaign_status_id
- name
- start_date
- end_date
- active
- description
- number_sent
- expected_response
- expected_revenue
- budgeted_cost
- actual_cost
- date_updated
- date_created

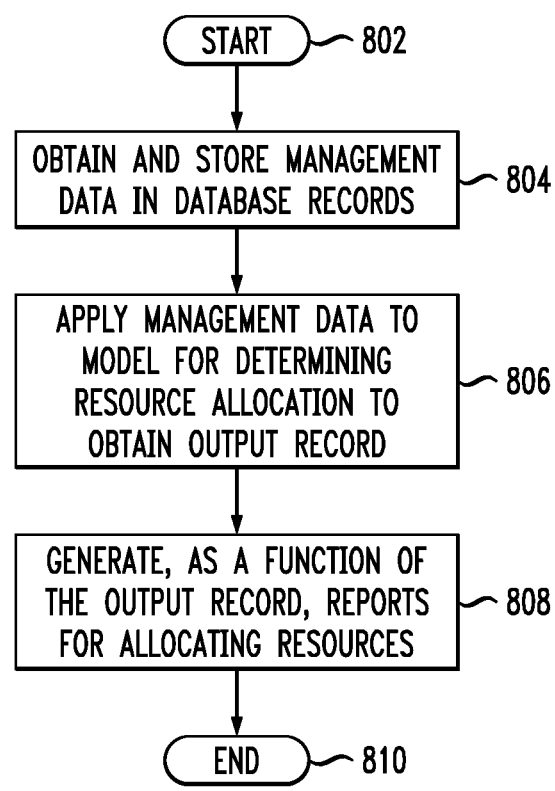

METHODS AND SYSTEM FOR MANAGING RECYCLING OF RECYCLABLE MATERIAL

CROSS-REFERENCE TO RELATED APPLICATIONS

This application is a continuation-in-part of U.S. patent application Ser. No. 11/345,867, filed on Feb. 2, 2006, which claims the benefit of U.S. Provisional Patent Application Ser. No. 60/650,610, filed on Feb. 7, 2005. This application also claims the benefit of U.S. Provisional Patent Application Ser. No. 60/825,383, filed on Sep. 12, 2006. Each of the foregoing applications is incorporated herein by reference in its entirety.

BACKGROUND

1. Field

The following generally relates to methods and systems for recycling. More particularly, the following relates to a method and system for managing activities associated with recycling.

2. Related Art

Over the past few decades, costs for collecting and disposing waste material ("waste") have skyrocketed. Decreases in available landfill capacity have caused the cost associated with disposing of waste in such landfills to increase. Adding to these costs are governmental (e.g., federal, state and local) landfill taxes, which have also increased sharply over the past few decades.

Even where landfill capacity exists, the cost associated with potential and actual environmental hazards associated with landfill operation are likewise increasing. These costs can include, for example, losses of valuable property and environmental cleanup costs for rehabilitating landfills and surrounding areas that become contaminated with dangerous chemicals due to the disposal and decomposition of the waste. Given the financial and environmental burdens associated with the collection and disposal of waste, municipalities have actively pursued recycling as an alternative to disposal.

Fortunately, demand for recyclable material has increased as a result of expansion in manufacturing. Manufacturers have long recognized that manufacturing goods from recyclable material less costly than manufacturing such goods from virgin material due to, for example, the costs associated with extracting and processing the virgin material into useable form.

Advances in Single Stream Recycling (SSR) technology reduce the cost of recycling. In addition, recent improvements in automated separation of commingled recyclable material at processing centers have dramatically reduced the cost of collecting, sorting, and processing the recyclable material. The combination of the SSR technology and automated separation enables an automated process to separate and process commingled recyclable material (for example, cardboard, paper, plastic, glass and aluminum material). This combination enables and permits processing centers to cut costs (e.g., reduce labor costs and sorting time) by using an automated process to separate the recyclables as opposed to manual labor. In addition, the combination enables municipalities to cut cost of collection by collecting the recyclable material in commingled form.

While information-technology tools have revolutionized the way many governments and industries operate, the waste management industry has not embraced information technology in the same way. As such, the waste management industry lacks modern, up-to-date information technology tools for efficiently carrying out business management, operations management and other activities associated with recycling (collectively "recycling activities"). In turn, this lack of information-technology tools has limited municipalities and/or other entities administering recycling programs to provide incentives for entities, such as business, governments and households, to recycle; to design effective strategies for recycling; to measure performance against such recycling strategies; etc.

Recycling reduces the financial and environmental burdens of waste disposal, reduces energy costs, and conserves our environment's resources. There is, therefore, a need to establish recycling initiatives which recognize the existing problems associated with the disposal of waste and promote recycling efforts as part of a waste management program.

SUMMARY

A method and system for managing a recycling entity is included. The method includes obtaining entity data associated with at least one entity. The at least one entity is operable to recycle a quantifiable measure of recyclable material. The method also includes obtaining resource data associated with resources associated with carrying out recycling, applying the entity data and the resource data to a model for determining an allocation of the resources so as to form at least one record, and generating, as a function of the at least one record, reports for allocating the resources.

BRIEF DESCRIPTION OF THE DRAWINGS

So the manner in which the above recited features are attained and can be understood in detail, a more detailed description is described below with reference to Figures illustrated in the appended drawings.

The Figures in the appended drawings, like the detailed description, are examples. As such, the Figures and the detailed description are not to be considered limiting, and other equally effective examples are possible and likely. Furthermore, like reference numerals in the Figures indicate like elements, and wherein:

FIGS. 3A-3D are a presentation deck illustrating an example of a set of reports associated with recycling of recyclable material;

FIG. 4 is a block diagram illustrating an example of a host configured for managing reporting data associated with recycling;

FIGS. 7A-7F are block diagrams illustrating an example of a model for determining an allocation resources associated with carrying out recycling activities; and FIG. 8 is a flow diagram illustrating an example of a flow for managing a recycling entity.

DETAILED DESCRIPTION

Figure 1:
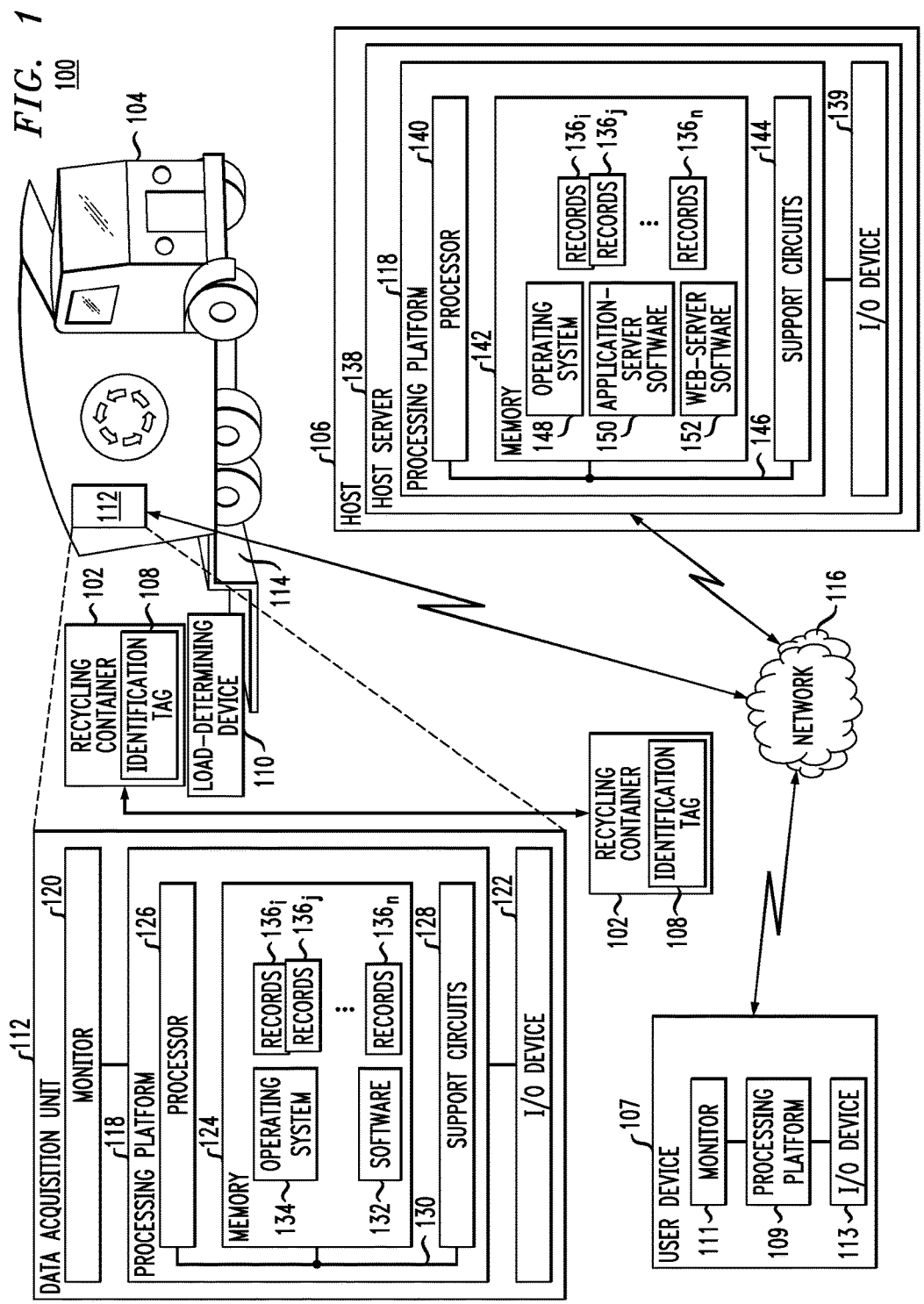
FIG. 1 is a block diagram illustrating an example of a system for recycling recyclable material.

In the following detailed description, numerous specific details are set forth in order to provide a thorough understanding of exemplary embodiments or other examples described herein. However, it will be understood that these examples may be practiced without the specific details. In other instances, well-known methods, procedures, components and circuits have not been described in detail, so as not to obscure the following description. Further, the examples disclosed are for exemplary purposes only and other examples may be employed in lieu of, or in combination with, the examples disclosed.

Overview

The following description includes a number of examples directed to, among other things, increasing a rate of participation of a given population in recycling, reducing costs associated with collection of waste ("waste collection"), enhancing efficiency of waste collection, effectively managing recycling activities, and opening a marketing channel for retailers to build value from corporate citizenship. To facilitate this, financial (e.g., monetary or economic) incentives may be provided to entities that participate in recycling their recyclable material; data associated with collection and disposal of such recyclable material ("recycling data") may be acquired, tracked and stored; various (e.g., statistical) analyses to the recycling data may be performed; and reports formed as a function of the recycling data and/or the various analysis of such recycling data may be provided.

Using the reports and underlying data acquisition, tracking, monitoring and analysis, participation (e.g., a rate thereof) may be determined, monitored and/or tracked; tonnages collected may be determined, monitored and/or collected, recycling rates may be determined, monitored and/or tracked, compliance with applicable laws may be monitored and/or tracked, trends from populations formed by the analyses may be extracted, monitored and/or tracked; long-term planning may be carried out; performance may be monitored and/or tracked; applications for municipal grants may be standardized; etc. Because the reports may be formed as a function of the recycling data, which may have a granularity down to an entity level (due to the recycling data being acquired and/or tracked for each of the entities) effective strategies for increasing recycling may be designed and/or implemented.

In addition, the reports and the underlying data acquisition, tracking and analysis enable officials and/or other constituents in all sectors of the economy to recognize and address trends on a micro and macro level. The reports, for example, may include a number of reports that indicate an accurate measure of effectiveness of recycling programs on a geographic basis. These reports may report tonnages collected, recycling rates, and participation rates, for instance.

In addition, the reports and underlying data acquisition, tracking and analysis may provide detailed data describing the effectiveness of recycling programs. For example, the reports may include one or more reports that indicate collection and disposal routes. These reports may be formed from the recycling data that was be analyzed to (i) design a route based on one or more calculations of a number of entities or tonnages needed to optimize such route; (ii) determine an optimum collection route based on tonnages collected and truck capacities and/or labor, (iii) participation rates for a given route and truck capacities and/or labor, etc. Alternatively, the reports may include and/or be formed from data and analysis detailing an overall efficiency of a recycling program. The reports may also provide detailed data that reports socio-economic relationships between recycling participation and demographic characteristics.

As part of the recycling data, hauling costs, tipping fees, distances traveled, etc., may be acquired monitored, tracked, analyzed and/or reported. For example; the hauling costs, tipping fees, distances traveled, etc. may be applied to one or more cost-benefit analyses, and reports formed therefrom. Advantageously, these and other reports may allow transfer stations, materials recovery facilities (MRFs), and processing facilities to determine from where they are getting their recyclables and how or whether they can more efficiently and economically collect and receive these recyclables.

The reports and the underlying data acquisition, tracking and analysis provide municipalities and waste managers with the ability not only to compare recycling rates and efficiencies with other municipalities and businesses, but also provide to the municipalities and waste managers the recycling data that includes high-quality datasets. These datasets may provide a clear advantage when applying for grants from government and nonprofit agencies because high quality data can be used to clearly articulate (i) an allocation of grant monies, and (ii) measurement metrics for expenditures of such grant monies.

Further, the reports and underlying data acquisition, tracking and analysis provide the ability to analyze data associated with recyclable material that has been recycled in conjunction with existing data garnered from a municipality's use of such material. An outcome of such analysis may provide the municipality with important accountings of energy use and economic activity, along with information on the environmental effects of the municipality's use of the material.

Additionally, because recycling data may be collected on an entity-to-entity basis, the analysis of such recycling data may be configured to factor out often-arbitrary lines separating neighborhoods, demographic and/or geographic areas. This, in turn, allows for degrees of freedom in waste management planning that were previously believed impossible to achieve. For instance, studies have shown that participation rates between different socio-economic classes within individual municipalities can vary significantly. Often, the participation rates are low in moderate-income areas and higher in median household income areas. By providing a combination of incentives (as described in more detail below), this variance may be reduce. Moreover, the reports may include a number of reports for effective targeting of outreach efforts for increasing recycling rates; the use of which may also reduce the variance.

Advantageously, the reports and underlying data acquisition, tracking and analysis promote recycling, which in turn, saves energy, reduces greenhouse gas emissions, reduces air and water pollution, and conserves natural resources. To explain in more detail:

1. Recycling Saves Energy. The processes for supplying recycled material to industry (including collection, processing and transportation) generally use less energy than the processes necessary to supply virgin materials to industry (including extraction, refinement, transportation and processing). In addition, energy savings associated with recycling may accrue in manufacturing processing, since recycled materials may require less additional processing than the virgin material.

2. Recycling Reduces Greenhouse Gas Emissions. Recycling reduces greenhouse gas emissions. Recycling reduces the need for industry to generate energy by burning fossil fuels. Recycling in lieu of landfill disposal also reduces emissions of greenhouse gases, such as methane from landfills.

3. Recycling Reduces Air And Water Pollution. Recycling reduces a range of pollutants from entering the air and water. This benefit accrues, because of reduced fossil fuel use and recycled materials have already been processed once. The benefits also accrue because recycling keeps materials out of landfills, where they can introduce leachate into groundwater systems, and out of solid waste incinerators, which emit pollutants into the air and generate uncombusted ash residue.

4. Recycling Conserves Natural Resources. Recycling reduces the need for landfills and other disposal facilities, allowing land to be used in a more environmentally beneficial manner. Recycling also reduces the pressure to expand forestry and mining production by substituting recycled materials for the use of virgin materials.

System Architecture Example

FIG. 1 is a block diagram illustrating an example of a system 100 for recycling recyclable material. The system includes recycling container 102, a pickup vehicle 104, a host 106 and a user device 107.

The recycling container 102 is adapted to accept recyclable material deposited by an entity ("deposited material") for collection by the pickup vehicle 104. The deposited material may include one type of or any combination of types of recyclable material, including, for example, cardboard, paper, plastic, glass and/or aluminum material. The recycling container 102 may be of any shape or size so long as it is adapted to hold a quantifiable measure of the deposited material. The recycling container 102 may be provided to an entity for a fee (e.g., a one-time, fixed, rental, deposit, or other type of fee) or for free (e.g., on loan or given outright).

The recycling container 102 includes an identification tag 108 for identifying the recycling container 102. The identification tag 108 may be used to track each collection of the deposited material. The identification tag 108 may be machine-readable device, such as a bar-code label, a magnetic-strip device, a radio-frequency-identification ("RFID") tag and the like; and may include and/or be programmed with information for identifying the recycling container 102, and in turn, information (e.g., an address, an account, etc.) associated with the entity ("entity information").

Alternatively, the identification tag 108 may be a non-machine readable label or other non-machine readable device. As such, the identification tag 108 may include an identifier that can be transferred to (e.g., manually entered into) the host 106, which in turn, uses the identifier to obtain information stored thereon for identifying the recycling container 102 and the entity information.

The pickup vehicle 104 may be a truck or other movable vehicle adapted to receive the recyclable materials from the recycling container 102. For example, the pickup vehicle 104 may include a lift 114 adapted to receive, capture and/or cause the transfer of some or all of the deposited material from the recycling container 102.

In addition, the pickup vehicle 104 may include a load-determining device 110 and a data acquisition unit 112. The load-determining device 110 may include any of, any multiple of, any combination of or any combination of multiples of a scale, load cell, load-cell system, a counting device and/or system or other measuring apparatus or system for (i) determining a quantifiable measure (e.g., weight, quantity, etc.) of the deposited material and/or (ii) transferring such quantifiable measure ("deposited-material measure") to the data-acquisition unit 112 for storage and/or subsequent processing. The load-determining device 110 may, for example, determine the deposited-material measure as a function of a plurality of weight measurements of the recycling container 102 obtained before and after the deposited material are transferred to the pickup vehicle 104.

Alternatively, the load-determining device 110 may determine the deposited-material measure as a function of quantities of the deposited material in recycling container 102 before and after such material are transferred to the pickup vehicle 104. The load-determining device 110 may determine the deposited-material measure in other ways as well.

Some or the entire load-determining device 110 may be coupled (e.g., affixed or removably attached) to the pickup vehicle 104. For example, all or portions of the load-determining device 110 may be coupled to the lift 114. Alternatively, all or portions of the load-determining device 110 may be removably attached to the vehicle for storage during transport, and detached from the pickup vehicle 104 to allow the load-determining device 110 to determine the deposited-material measure and/or transfer the deposited-material measure to the data-acquisition unit 112.

The data-acquisition unit 112 and host 106 may communicatively coupled together via a link or network (collectively "network") 116. This way, the data-acquisition unit 112 and host 106 may exchange information via one or more communications carried over the network 116.

The network 116 may be a partial or full deployment of most any communication or computer network or link, including any of, any multiple of, any combination of or any combination of multiples of a public or private, terrestrial wireless or satellite, and wireline networks or links. The network 116 may include, for example, network elements from a Public Switch Telephone Network ("PSTN"), the Internet, core and proprietary public networks, wireless voice and packet-data networks, such as 1G, 2G, 2.5G and 3G telecommunication networks, wireless office telephone systems ("WOTS") and/or wireless local area networks ("WLANs"), including, Bluetooth and/or IEEE 802.11 WLANs, wireless personal area networks ("WPANs"), wireless metropolitan area networks ("WMANs") and the like; and/or communication links, such as Universal Serial Bus ("USB") links; parallel port links, Firewire links, RS-232 links, RS-485 links, Controller-Area Network ("CAN") links, and the like.

The network elements and/or communication links may include circuit-switched as well as packet-data elements to provide transport of content, triggers and/or other information; and may be configured to communicate such information using any number of protocols and in any manner consistent with exchanging such information among data-acquisition unit 112 and host 106. These protocols may include standardized, proprietary, open-source, and freely-available communication protocols for communicating content in circuit-switching and/or packet data networks, and the like.

The data acquisition unit 112 may be, for example, any of or any combination of a personal computer; a portable computer, a handheld computer; a mobile phone, a digital assistant, a personal digital assistant, a cellular phone, a smart phone, a pager, a digital tablet, a laptop computer, an Internet appliance and the like. In general, the data acquisition unit 112 includes a processor-based platform that operates on any suitable operating system, such as Microsoft® Windows®, Linux and/or Symbian; and that is capable of executing software.

Additionally, the data acquisition unit 112 may be formed in a single unitary device and concentrated on a single server, client, peer or other type node. Alternatively, the data acquisition unit 112 may be formed from one or more separate devices, and as such, may be distributed among a number of server, client, peer or other type nodes. The data acquisition unit 112 may also be scalable (i.e., may employ scale-up and/or scale-out approaches).

The data acquisition unit 112 may include a large number of elements; most of which are not shown in FIG. 1 for simplicity of exposition. As shown, the data acquisition unit 112 includes a processing platform 118 that is operable to control, manipulate or otherwise interact with a monitor 120 or other display device (collectively "monitor") and/or an input/output ("I/O") device 122, via respective couplings.

The monitor 120 may be any suitable device that displays viewable images and/or text generated by the processing platform 118. For instance, the monitor 120 may be any of or any combination of a liquid-crystal-display based monitor, a cathode ray tube monitor, a plasma display monitor, a surface-conduction electron-emitter display monitor, an organic light-emitting diode display monitor, or any other monitor that can display viewable images using television and/or computer protocols, such as Super Video Graphics Array, Digital Visual Interface, Phase Alternating Line, SECAM, NTSC, etc.

The I/O device 122 may be any device that accepts input from a user (man or machine) to control, manipulate or otherwise interact with the operation of the processing platform 118. In addition, the I/O device 122 may be adapted to obtain from the identification tag 108 the entity information and/or identifier that identifies the recycling container 102. Examples of the I/O device 120 include any of or any combination of pointing device, such as a mouse, joystick, trackball, touchpad, pointing stick, light pen, head pointer, soap mouse, eye tracking devices, digitizing tablet and stylus, data glove that translates the user's movements to computer gestures; and a key-in device, such as a keyboard or a touchpad; a reader, such as a bar-code reader, a magnetic-strip reader, a RFID reader, and the like. Although shown as a single device, the I/O device 122 may be separated into two or more devices; each of which may have, as compared to the I/O device 122, reduced, increased or equivalent functionality. In addition, the I/O device 122 and the monitor 120 may be integrated or otherwise combined together in a single device and/or housing.

The processing platform 118 includes memory 124, one or more processors (collectively "processor") 126, supports circuits 128 and bus 130. The memory 124 may be or employ random access memory, read-only memory, optical storage, magnetic storage, removable storage, erasable programmable read only memory and variations thereof, content addressable memory and variations thereof, flash memory, disk drive storage, removable storage, any combination thereof, and the like.

The memory 124 may store and/or receive requests from the processor 126 to execute software 132, such as operating system 134. Additionally, the memory 124 may store and/or receive requests from the processor 126 to obtain (i) operands, operators, dimensional values, configurations, and other data that are used by the operating system 134 and the software 132 to control the operation of and/or to facilitate performing the functions of the data acquisition unit 112; and/or (ii) one or more records or other data structures (collectively, "records") $136_i$-$136_n$.

Each of the records $136_i$-$136_n$ may be stored as or in a single file or a plurality of files, and may be structured as text, a table, a database, a distributed hashtable, a distributed concurrent object store, a document formed using a markup or markup-like language, and the like. The records $136_i$-$136_n$ may include, for example, a deposited-material record $136_j$. The deposited-material record $136_j$ may store, be populated with or otherwise adapted to hold the deposited-material measure as determined by the load-determining device 110.

The processor 126 may execute (e.g., launch, generate, run, maintain, etc.) and/or operate on the operating system 134. The processor 126 may be capable of (i) executing the software 132; (ii) storing the records $136_i$-$136_n$ in the memory 124; (iii) dispatching to the host 106 the records $136_i$-$136_n$ (including the deposited-material record $136_j$) for further processing; (iv) issuing triggers and/or (v) issuing one or more commands and/or instructions to cause the further processing of records $136_i$-$136_n$. Examples of the processor 126 include conventional processors, microprocessors, multi-core processors, microcontrollers and the like.

The support circuits 128 facilitate operation of the processor 126 and may include well-known circuitry or circuits, including, for example, an I/O interface; one or more network-interface units ("NIUs"); cache; clock circuits; power supplies; and the like. The NIUs may be adapted for communicating over any of, any multiple of, any combination of or any combination of multiples of terrestrial wireless, satellite, and/or wireline media. The processor 126 (and in turn, the data-acquisition unit 112) may use the NIUs for exchanging content with the host 106 via network 116.

The bus 130 provides for transmissions of digital information among the processor 126, the memory 124, support circuits 128 and other portions of the data acquisition unit 112 (shown and not shown). The I/O interface is adapted to control transmissions of digital information between (shown and not shown) components of the data acquisition unit 112. In addition, the I/O interface is adapted to control transmissions of digital information between I/O devices disposed within, associated with or otherwise attached to the data acquisition unit 112. Examples of the I/O devices include the I/O device 122, the monitor 120, and any or any combination of (i) storage devices, including but not limited to, a tape drive, a floppy drive, a hard disk drive or a compact disk drive, (ii) a receiver, (ii) a transmitter, (iii) a speaker, (iv) a display, (v) a speech synthesizer, (vi) an output port, and (vii) the like.

The operating system 134 may include code for operating the data acquisition unit 112 and for providing a platform onto which the software 132 can be executed. The software 132 may include data-acquisition software, which may carry out the acquisition of and storage of the deposited-material measure into the deposited-material record $136_j$. The data-acquisition software may also communicate the deposited-material record $136_j$ to the host 106 using, for example, the communication and/or security protocols compatible with the data acquisition unit 112 and the host 106. To facilitate this, the data-acquisition software may include code to allow the data-acquisition software (and/or the data acquisition unit 112) to substantiate its identity, and in turn, receive authorization to access (e.g., view, configure, use and/or execute) services of the host 106.

The host 106 may include one or more servers, including a host server 138. The host server 138 may be deployed in one or more general or specialty purpose computers, personal computers, mainframes, minicomputers, server-type computers and/or any a processor-based platform that operates on any suitable operating system, such as Microsoft® Windows® and/or Linux; and that is capable of executing software.

Like the data acquisition unit 112, the host server 138 may include a large number of elements; most of which are not shown in FIG. 1 for simplicity of exposition. The elements of host server 138 may be formed in a single unitary device and concentrated on a single server, client, peer or other type node. Alternatively, the elements of the host server 138 may be formed from two or more separate devices, and as such, may be distributed among a number of server, client, peer or other type nodes.

The host server 138 may be deployed in accordance with the scale-up and/or scale-out approaches. Using the scale-up approach, the host server 138 may increase its processing power, amount of memory and number of networkable connections by utilizing a symmetrical, multi-processor architecture so as to provide additional capacity. A benefit of this scale-up approach is that such approach provides for simplified configuration and management as compared to the scale-out approach. Using the scale-out approach, the host server 138 may increase its processing power, amount of memory and number of networkable connections by incrementally adding and/or removing capacity as needed, balancing workload across multiple processors, multiple servers, dedicating specific processors and/or servers for performing specific tasks, using physical or logical servers (e.g., a multi-node cluster approach), etc.

As shown, the host server 138 includes one or more processing units (collectively "processor") 140, memory 142, supports circuits 144 and bus 146. The processor 140 may be one or more conventional processors, microprocessors, multi-core processors, microcontrollers and the like.

The bus 146 provides for transmissions of digital information among the processor 140, memory 142 and support circuits 144 and other (not shown) portions of the host server 138. The support circuits 144 facilitate operation of the processor 140, and may include well-known circuitry or circuits, including, for example, one or more input/output I/O interfaces; one or more NIUs; cache; clock circuits; power supplies and the like.

The I/O interface provides an interface to control the transmissions of digital information among (shown and not shown) components of host server 138. In addition, the I/O interface provides an interface to control the transmissions of digital information among I/O devices 139 associated with or otherwise attached to the host server 138. The I/O devices 139 may be embodied as any or any combination of (i) storage devices, including but not limited to, a tape drive, a floppy drive, a hard disk drive or a compact disk drive, (ii) a receiver, (ii) a transmitter, (iii) a speaker, (iv) a display, (v) a speech synthesizer, (vi) an output port, and (vii) a pointing device, such as a mouse, joystick, trackball, touchpad, pointing stick, light pen, head pointer, soap mouse, eye tracking devices, digitizing tablet and stylus, data glove that translates the user's movements to computer gestures; (vii) a key-in device, such as a keyboard or a touchpad, (viii) and the like.

The NIUs facilitate exchange (e.g., sending and/or receiving) of content. Accordingly, the NIUs may be adapted for communicating over terrestrial wireless, satellite, and/or wireline media.

The memory 142 may be or employ random access memory, read-only memory, optical storage, magnetic storage, removable storage, erasable programmable read only memory and variations thereof, content addressable memory and variations thereof, flash memory, disk drive storage, removable storage, any combination thereof, and the like. The memory 124 may store and/or receive requests from the processor 140 to execute various software packages, such as operating system 148, application-server software 150 and web-server software 152.

Additionally, the memory 142 may store and/or receive requests from the processor 140 to obtain the records $136_i$-$136_n$ (e.g., copies thereof). As above, each of the records $136_i$-$136_n$ may be stored as or in a single file or a plurality of files, and may be structured as text, a table, a database, a distributed hashtable, a distributed concurrent object store, a document formed using a markup or markup-like language, and the like. The records $136_i$-$136_n$ may be stored, for example, using a Microsoft SQL Server and accessible through an ODBC connection.

Like the records $136_i$-$136_n$, the memory 142 may store and/or receive requests from the processor 140 to obtain operands, operators, dimensional values, configurations, and other data that are used by the various software packages to control the operation of and/or to facilitate performing the functions of the host server 138 and/or the host 106.

The application-server software 150, when executed by the processor 140, is operable to (i) communicate with the data acquisition unit 112, via the network 116, to obtain the deposited-material record $136_j$; and determine a value associated with the deposited-material measure stored in the deposited-material record $136_j$. In addition, the application-server software 150, when executed by the processor 140, is operable to associate the value to a credit, which may be redeemable by the entity; post the credit to the credit to a user account associated with the entity ("entity account"); and provide the web-server software 152 with access to the entity account.

The web-server software 152, when executed by the processor 140, is operable provide on one or more web pages to allow the entity to access the entity account, and in turn, the credit and other information associated with the recycling activities. For example, web-server software 152 may post the credit on the web pages that are accessible to entity via the user device 107 and entity account, so as to enable the entity to view details of the entity account. The details of the entity account may include the credit (and/or previously accrued credits) associated with the recycling activities of the deposited (and/or previously deposited) material, dates associated with the recycling activities, quantities of the deposited and (previously deposited) material recycled over a given period of time; debits from the credit (and/or previously accrued credits), detailed history of spending of the credit (and/or previously accrued credits), any orders for vouchers for redeemed credits, and the like.

In addition, the web-server software 152, when executed by the processor 140, is operable to allow the entity, via the user device 107, to redeem the credit. This may include the web-server software 152 providing a portal to retailers to allow the entity to redeem the credit (and/or previously accrued credits) at the retailers to obtain goods, services, coupons valued for goods or services, other benefits or discounts, and the like.

The web-server software 152 may also be operable to allow the entity to transform the credit (and/or previously accrued credits) into one or more vouchers that may be spent at the participating retailers or donated to some other entity. To facilitate this, the web-server software 152 includes code to allow the entity to (i) order the vouchers for delivery by mail, email or other communication medium; (i) provide information to the entity via the user device 107 to allow the entity to print or otherwise reduce to physical form, store it on the user device 107 or a peripheral device coupled to the user device 107 (e.g., a PDA, memory device, etc.).

The user device 107 may be, for example, any of or any combination of a personal computer; a portable computer, a handheld computer; a mobile phone, a digital assistant, a personal digital assistant, a cellular phone, a smart phone, a pager, a digital tablet, a laptop computer, an Internet appliance and the like. In general, the user device 100 may include a processor-based platform that operates on any suitable operating system, such as Microsoft® Windows®, Linux and/or Symbian; and that is capable of executing software.

The user device 107 may, however, include a large number of elements; many of which are not shown in FIG. 1 for simplicity of exposition. The user device 107 includes elements similar to the data acquisition unit 112, except as described herein below. The user device 107 may be formed in a single unitary device and concentrated on a single server, client, peer or other type node. Alternatively, the user device 107 may be formed from one or more separate devices, and as such, may be distributed among a number of server, client, peer or other type nodes. In addition, the user device 107 may be scalable.

As shown, the user device 107 may include a processing platform 109 that is operable to control, manipulate or otherwise interact with a monitor 111 and/or an I/O device 113, via respective couplings. The processing platform 109, the monitor 111 and the I/O device 113 include elements similar to or the same as the processing platform 118, the monitor 120 and the I/O device 122 of the data acquisition unit 112, and as such, the details of such elements are not reproduced here for simplicity of exposition.

The user device 107 is operable to form a user interface through which the entity can access the web pages provided by the web-server software 152. To facilitate this, the user interface may be communicatively coupled with the host server 138 via a network 116. The user interface may be, for example, a graphical-user interface that is operable execute a web browser application for rendering on the monitor 111 the web pages provided by the web-server software 152. As noted, the entity may use the user device 107 to access the users account, redeem credits and other like functions.

Operation Example

Figure 2:
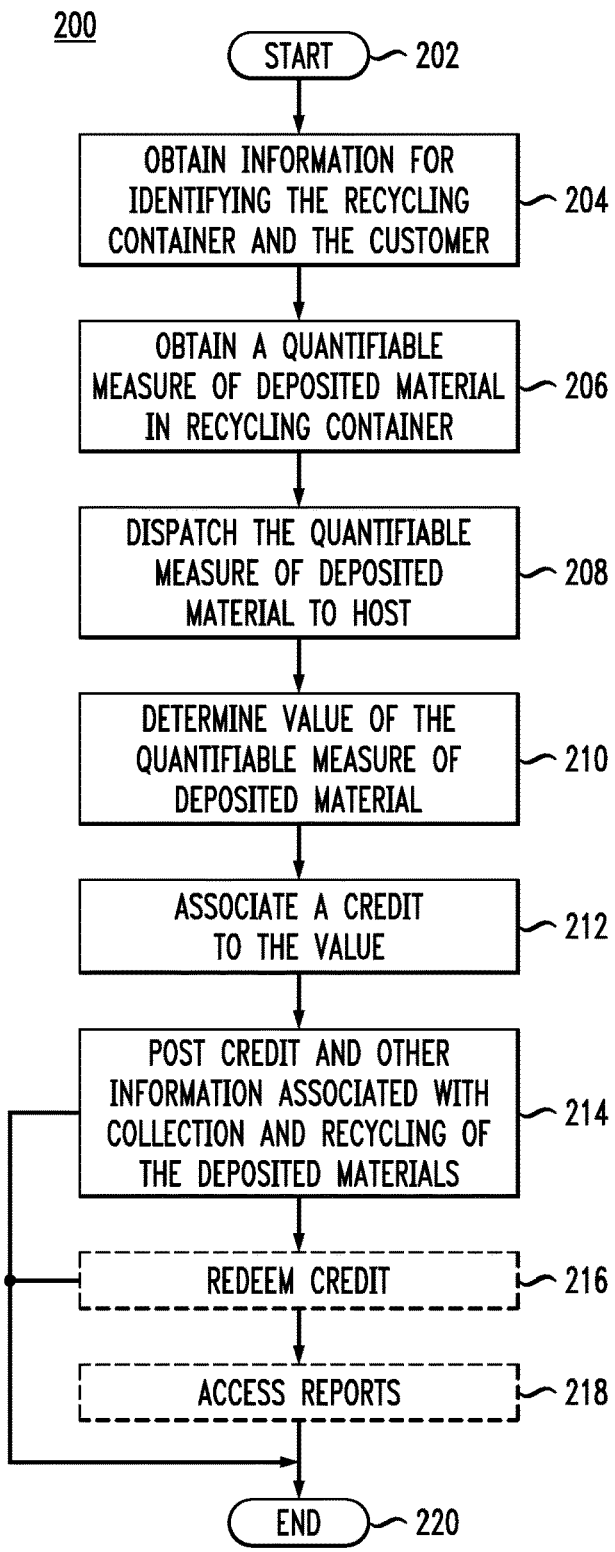
FIG. 2 is a flow diagram illustrating an example of a flow for recycling recyclable material.

Referring now to FIG. 2, a flow diagram illustrating an example of a flow 200 for recycling recyclable material is shown. For convenience, the flow 200 is described with reference to the system 100 of FIG. 1. The flow 200, however, may be carried out using other architectures as well.

The flow 200 starts at termination block 202. Prior to termination block 202, the entity deposits the recyclable material in the recycling container 102, and the pickup vehicle 104 is dispatched to and arrives at an address of the entity. After termination block 202, the flow 200 may transition to process block 204.

At process block 204, the data acquisition unit 112 obtains the information for identifying the recycling container 102 and the entity information. The data acquisition unit 112 may obtain such information from the identification tag 108. The information from the identification tag 108 may be obtained with or without the entity and/or operator of the pickup vehicle 106 or other person (collectively "operator") interacting with the data acquisition unit 112.

For example, the data acquisition unit 112 may obtain the information from the identification tag 110 automatically using the reader (e.g., a RFID receiver, bar-code reader, magnetic-strip reader, etc.) that is communicatively coupled the I/O interface of the data acquisition unit 112. To facilitate this, the operator may position the recycling container 102, and in turn, the identification tag 108 in a field of view of the reader.

Alternatively, the operator may position the reader so that the recycling container 102 falls within the field of view of the reader. The reader may be affixed to the pickup vehicle 104 (e.g., attached to the lift 114 or other portion of the vehicle) or removably attached to the pickup vehicle 104 (e.g., a tethered handheld scanner).

As another alternative, the data acquisition unit 112 may obtain the information by having the operator, via the one of the I/O devices (e.g., the keyboard, touchpad, mouse, etc.), enter the identifier associated the identification tag 108. The data acquisition unit 112 may obtain the information in other ways as well. After process block 204, the flow 200 may transition to process block 206.

At process block 206, the data acquisition unit 112 obtains a quantifiable measure of deposited material in recycling container 102. To facilitate this, the recycling container 102 is positioned or otherwise placed on the load-determining device 110, and the load-determining device 110 receives a trigger, command or other input to cause the load-determining device 110 to determine and transfer the deposited-material measure to the data acquisition unit 112. This may be carried out, as noted above, in any number of ways.

One of these ways includes positioning the recycling container 102 on the lift 114 to which is attached the load-determining device 110, and causing the load-determining device 110 to determine the deposited-material measure as a function of a plurality of weight measurements of the recycling container 102 obtained before and after the deposited material is transferred to the pickup vehicle 104 by the lift 114. Alternatively, the load-determining device 110 may, for example, determine the deposited-material measure as a function of a plurality of measurements of quantities of the deposited material in recycling container 102 obtained before and after such material is transferred to the pickup vehicle 104 by the lift 114. The load-determining device 110 may determine the deposited-material measure in other ways as well.

After determining the deposited-material measure, the load-determining device 110 transfers the deposited-material measure to the data acquisition unit 112. This may be done in response to a query by the data acquisition unit 112 and/or upon being triggered as a result of a condition, such as in response to one or more manipulations of the I/O device 122 of the data acquisition unit 112 by the operator or other impetus. After transfer, the data acquisition unit 112 stores the deposited-material measure in the deposited-material record $136_j$ for later dispatch to the host 106. The data acquisition unit 112 may obtains the deposited-material measure in other ways as well.

After process block 206, the flow 200 may transition to process block 208. At process block 208, the data acquisition unit 112 dispatches the deposited-material measure to the host 106 for further processing. The data acquisition unit 112 may do this, for example, by dispatching the deposited-material record $136_j$ to the host 106. The dispatch may be carried out in response to a query by the host 106 and/or upon being triggered as a result of a condition, such as in response to one or more manipulations of the I/O device 122 of the data acquisition unit 112 by the operator or other impetus. Alternatively, the data acquisition unit 112 may dispatch the deposited-material record $136_j$ on a periodic basis using, for example, a routine for synchronizing and/or replicating the deposited-material record $136_j$ on the host 106. After process block 208, the flow 200 may transition to process block 210.

At process block 210, the host 106 uses the host server 138 and application-server software 150 to determine a value associated with the deposited-material measure stored in the deposited-material record $136_j$. To facilitate this, the host server 138 and application-server software 150 first obtain the deposited-material record $136_j$ from the data-acquisition unit 112. The application-server software 150 may obtain the deposited-material record $136_j$ using the routine for synchronizing and/or replicating the deposited-material record $136_j$ on the data-acquisition unit 112. Alternatively, the application-server software 150 may obtain the deposited-material record $136_j$ via an upload over the network 116. The upload may be handled, for example, by a ColdFusion MX backend executing on the application-server software 150. Using Cold Fusion Markup Language (CFML), the ColdFusion MX backend parses, where appropriate, and stores the deposited-material record $136_j$ in memory 142.

As noted above, the value associated with the deposited-material measure may be financial (e.g., monetary or economic). For example, the value may be based, at least in part, on an amount of the deposited material. Alternatively. The value may be based, at least in part, upon financial offerings of one of more retailers participating in a rewards program ("participating retailers"). The value may have a minimum and/or a maximum. The maximum may be based on time (e.g., no more than "x" for a given period of time).

To facilitate determining the value, the application-server software 150 may employ database software along with a database and algorithms that form one or more models for assigning the value to the deposited-material measure. In a first exemplary embodiment, the value may be assigned by the fact a participant recycled any amount. In another exemplary embodiment, the value may be assigned correlating to the amount a participant recycled in a given period of time. Alternative exemplary embodiments contemplate combinations of the above, as well as similar predetermined algorithms. The database software in combination with the database and algorithms may provide flexibility in applying different rates for determining the value. These rates may differ based on availability of the financial offerings, the type of entity, geographic area of the entity, and other demographics. The rates may be applied so that the entities receive an optimum incentive to for recycling the recyclable materials. After process block 210, the flow 200 may transition to process block 212.

At process block 212, the application-server software 150 associates a credit to the value. To facilitate determining the credit, the application-server software 150 may employ the database software along with the database and algorithms that form one or more models for determining and associating a credit to the value to the deposited-material measure. After process block 212, the flow 200 may transition to process block 214.

At process block 214, after the application-server software 150 posts credit to the entity account, the web-server software 152 posts account (and in, turn, the credit) on a web page to allow the entity to access the credit and the other information associated with the recycling activities. To facilitate this, the web-server software 152 obtains account, and in turn, the credit and the other information associated with the recycling activities, from the application-server software 150. The web-server software 152 may obtain the credit and the other information in response to a query by the web-server software 152 and/or upon being triggered as a result of a condition, such as in response to the application-server software 150 pushing such information to the web-server software 152.

After process block 214, the flow 200 may transition to optional process blocks 216, 218 and/or to process termination block 220. At process block 216, the web-server software 152 allows the entity, via the user device 107, to redeem the credit. This may include the web-server software 152 providing a portal to the retailers to allow the entity to redeem the credit (and/or previously accrued credits) at the retailers to obtain goods, services, coupons valued for goods or services, other benefits or discounts, and the like.

The web-server software 152 may also be operable to allow the entity to transform the credit (and/or previously accrued credits) into one or more vouchers that may be spent at the participating retailers or donated to some other entity. To facilitate this, the web-server software 152 allows the entity to (i) order the vouchers for delivery by mail, email or other communication medium; (i) provide information to the entity via the user device 107 to allow the entity to print or otherwise reduce to physical form, store it on the user device 107 or a peripheral device coupled to the user device 107.

After process block 216, the flow 200 may transition to optional process block 218 or to termination block 220. At process block 218, the web-server software 152 provides the entity with access to one or more reports, which are formed as a function of the credit and the other information associated with the recycling activities (collectively "report data").

The reports may include one or more reports that report data at an entity, street, neighborhood, community, township, county, city or state level. The reports may include reports that report participation rates and averages, and recycling rates and averages. As noted above, the report data and reports may be used to enhance collection routing and efficiency, and target community outreach. The report data and reports enable municipalities, private haulers, contractors, environmental consultants and governmental officials to understand when and where the recycling fleet should go, and to determine truck capacity for routes, and frequency of collection. The report data and reports enable municipalities, private haulers, environmental consultants, academics and government officials to perform community outreach and to measure the effectiveness of community outreach and recycling education efforts.

Examples of the reports include a Single User Report, a Full User Report, a Single Vendor Report, a Vendor Report, a Vendor Report (Graph), a Monthly Overview Report, a Monthly Route Overview Report, a Hauler Overview Report, an Analysis of Recycling and Participation Rates Report, and a Daily Report of Rewards Ordered Report, as shown in FIGS. 3A-3D. Other examples of the reports are noted above under the section labeled "Overview."

After process block 218, the flow 200 may transition to termination block 220. At termination block 220, the flow 200 terminates. Alternatively, the flow 200 may be repeated periodically, in continuous fashion, or upon being triggered as a result of a condition, such as obtaining another quantifiable measure of deposited material in recycling container 102. As another alternative, the flow 200 may be repeated for a multiple of entities.

Although the foregoing describes using the host 106 and/or user device 107 to carry out process blocks 214-216 electronically, such process blocks may be carried out using hard copy documents mailed to the entity (for example, the reports, such as monthly account statements, can be mailed to the entity). The hardcopy documents may be carried out in lieu of or in addition to carrying out the process blocks 216-216 electronically. Further, it is noted that location of the entity associated with recycling container 102 can garnered using a positioning receiver of a global positioning system or other type navigation system. This positioning receiver may be affixed to or removably attached to the pickup vehicle 102 and/or the recycling container 102.

The flow 200 beneficially provides a unique economic incentive for increasing participation rates, as well as for entities to increase their recycling rate. In addition, the flow 200 may cause households, governments and businesses to receive certain benefits, such as summarized in Table 1 below.

TABLE 1

| Benefits to Households | Benefits to Government | Benefits to Business |
|---|---|---|
| Receive an economic incentive to recycle | Reduce taxes due to reduced costs of waste disposal | Build value from corporate citizenship |
| Reduce taxes due to reduced costs of waste disposal | Enhance collection routing efficiency | Access new marketing channel |
| Support responsible businesses | Enhance data collection and analysis | Measure return on investment |
| Preserves environment | Preserves environment | Preserves environment |

Report Data Management Example

Referring now to FIG. 4, a block diagram illustrating an example of a host 400 configured for managing reporting data of one or more entities is shown. The host 400 is similar to the host 100 of FIG. 1, except as described herein below. The host 400, like the host 100, is adapted to carryout process blocks 210-218 of FIG. 2 for a plurality of entities.

Like the host 106, the host 400 includes the host server 138, and in turn, the processor 140, the memory 142 and the I/O device 144. In addition to the various software packages, such as operating system 148, application-server software 150 and web-server software 152, and the records $136_1$-$136_n$, the memory 142 may store database software 402 and a database 404.

The database software 402 may include a number of software modules that are called by the database software 402 for execution by the processor 140. These software modules include a geographic analysis module 406, a historical analysis module 408, a route analysis module 410, a route optimization module 412, a compliance determination module 414, and an incentive response module 416.

The geographic analysis module 406, when executed by the processor 140, is operable to analyze geographic recycling patterns of one or more of the entities. The historical analysis module 408, when executed by the processor 140, is operable to analyze temporal trends of recycling of one or more of the entities.

The route analysis module 410, when executed by the processor 140, is operable to analyze recycling statistics for one or more recycling pickup vehicles, such as pickup vehicle 104. The route optimization module 412, when executed by the processor 140, is operable to predict an optimal route for the recycling pickup vehicles.

The compliance determination module 414, when executed by the processor 140, is operable for determining, for one or more of the entities, a statistical likelihood of compliance with recycling requirements. The incentive response module 416, when executed by the processor 140, is operable to determine, for one or more of the entities, responsiveness to recycling incentives.

Figure 5:
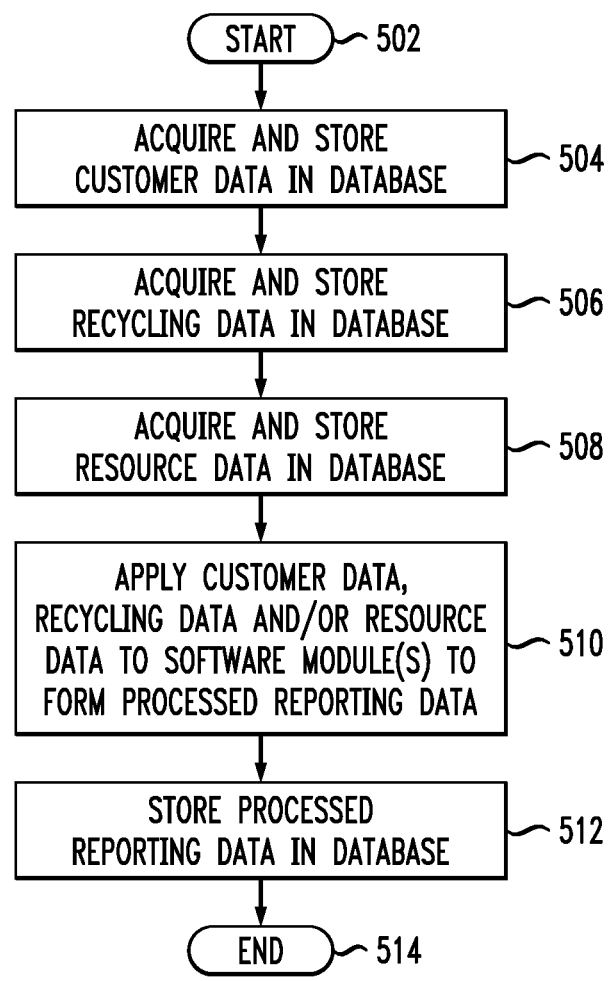
FIG. 5 is a flow diagram illustrating an example of a flow for managing reporting data associated with recycling.

FIG. 5 is a flow diagram illustrating an example of a flow 500 for managing reporting data of one or more entities. For convenience, the flow 500 is described with reference to the host 400 of FIG. 4. The flow 500, however, may be carried out using other architectures as well.

The flow 500 starts at termination block 502. After termination block 502, the flow 500 may transition to process block 504. At process block, the database software 402 acquires and stores in the database 404 data associated with each of the entities ("entity data"). For each of the entities, this entity data may include, for example, the entity information associated with the identification tag 108, including the address of the entity, entity account information, and the like. After process block 504, the flow 500 may transition to process block 506.

At process block 506, the database software 402 acquires and stores in the database 404 recycling data. The recycling data may include, for each of the entities, a deposited-material measure stored in a deposited-material record (like deposited-material record $136_j$) and other information associated with the deposited-material measure. This other information may include, for example, date and time of collection, level condition of the recycling receptacle 102, and the like. Each deposited-material measure may include, for example, a gross weight of the deposited material, a tare weight of the deposited material; a net weight of the deposited material, etc. After process block 506, the flow 500 may transition to process block 508.

At process block 508, the database software 402 acquires and stores in the database 404 data associated with resources ("resource data") for carrying out the recycling activities, such as haulers, transfer stations, MRFs and/or processing facilities. After process block 508, the flow 500 may transition to process block 510.

At process block 510, the database software 402 applies the entity data, the recycling data, and/or the resource data to one or more of the software modules to form processed reporting data. For example, the database software 402 may apply the entity data, the recycling data and/or the resource data to the geographic analysis module 406. The geographic analysis module 406 may use the entity data, the recycling data and/or the resource data to analyze geographic recycling patterns of the entities, and in turn, form the processed reporting data as a function of such analysis.

Alternatively, the database software 402 may apply the entity data, the recycling data and/or the resource data to historical analysis module 408. The historical analysis module 408 may use the entity data, the recycling data and/or the resource data to analyze temporal trends of recycling of the entities, and in turn, form the processed reporting data as a function of such analysis.

As another example, the database software 402 may apply the entity data, the recycling data and/or the resource data to route analysis module 410. The route analysis module 410 may use the entity data, the recycling data and/or the resource data to analyze recycling statistics of the recycling pickup vehicles, and in turn, form the processed reporting data as a function of such analysis.

As yet another example, the database software 402 may apply the entity data, the recycling data and/or the resource data to the route optimization module 412. The route optimization module 412 may use the entity data, the recycling data and/or the resource data to predict an optimal route for the recycling pickup vehicles, and in turn, form the processed reporting data as a function of such prediction.

Alternatively, the database software 402 may apply the entity data, the recycling data and/or the resource data to the compliance determination module 414. The compliance determination module 414 may use the entity data, the recycling data and/or the resource data to determine, for one or more of the entities, a statistical likelihood of compliance with recycling requirements. As another example, the database software 402 may apply the entity data, the recycling data and/or the resource data to the incentive response module 416. The incentive response module 416 may use the database software 402 may apply the entity data, the recycling data and/or the resource data to determine, for one or more of the entities, responsiveness to recycling incentives, and in turn, form the processed reporting data as a function of such analysis.

After process block 510, the flow 500 may transition to process block 512. At process block 512, the database software 502 stores the processed reporting data in the database 504. This processed-reporting data may be supplied to the web-server software 152 or other application for reporting purposes. Alternatively, the processed-reporting data may be iterated into a subsequent performance of the flow 500.

After process block 512, the flow 500 may transition to termination block 514, at which point the flow 500 terminates. Alternatively, the flow 500 may be repeated periodically, in continuous fashion, or upon being triggered as a result of a condition, such as a command or trigger. As another alternative, the process block 510 and/or process block 512 may be repeated periodically, in continuous fashion, or upon being triggered as a result of a condition.

Recycling Entity Management Example

Figure 6:
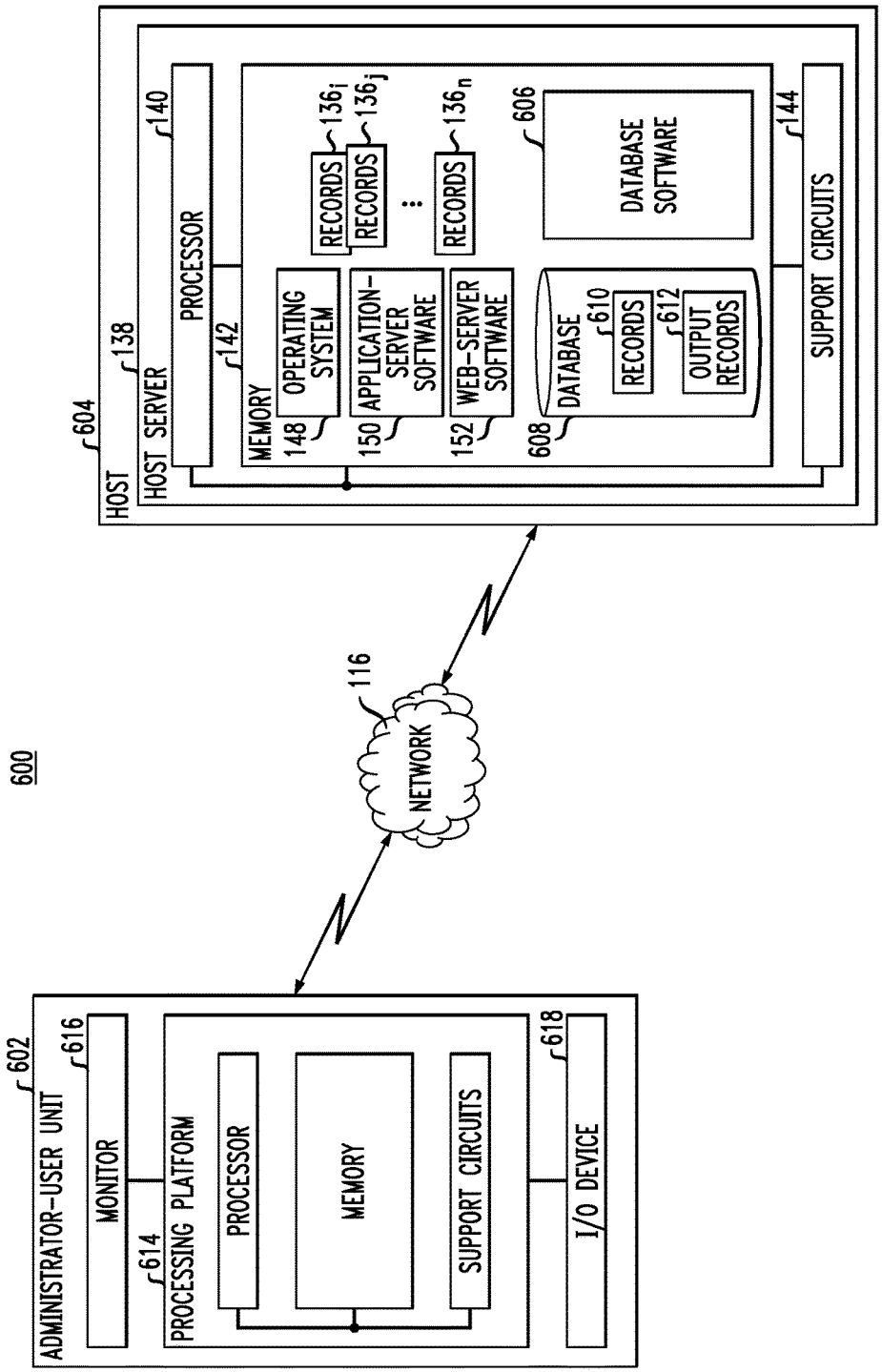
FIG. 6 is a block diagram illustrating an example of a system for managing a recycling entity.
Figure 7C:
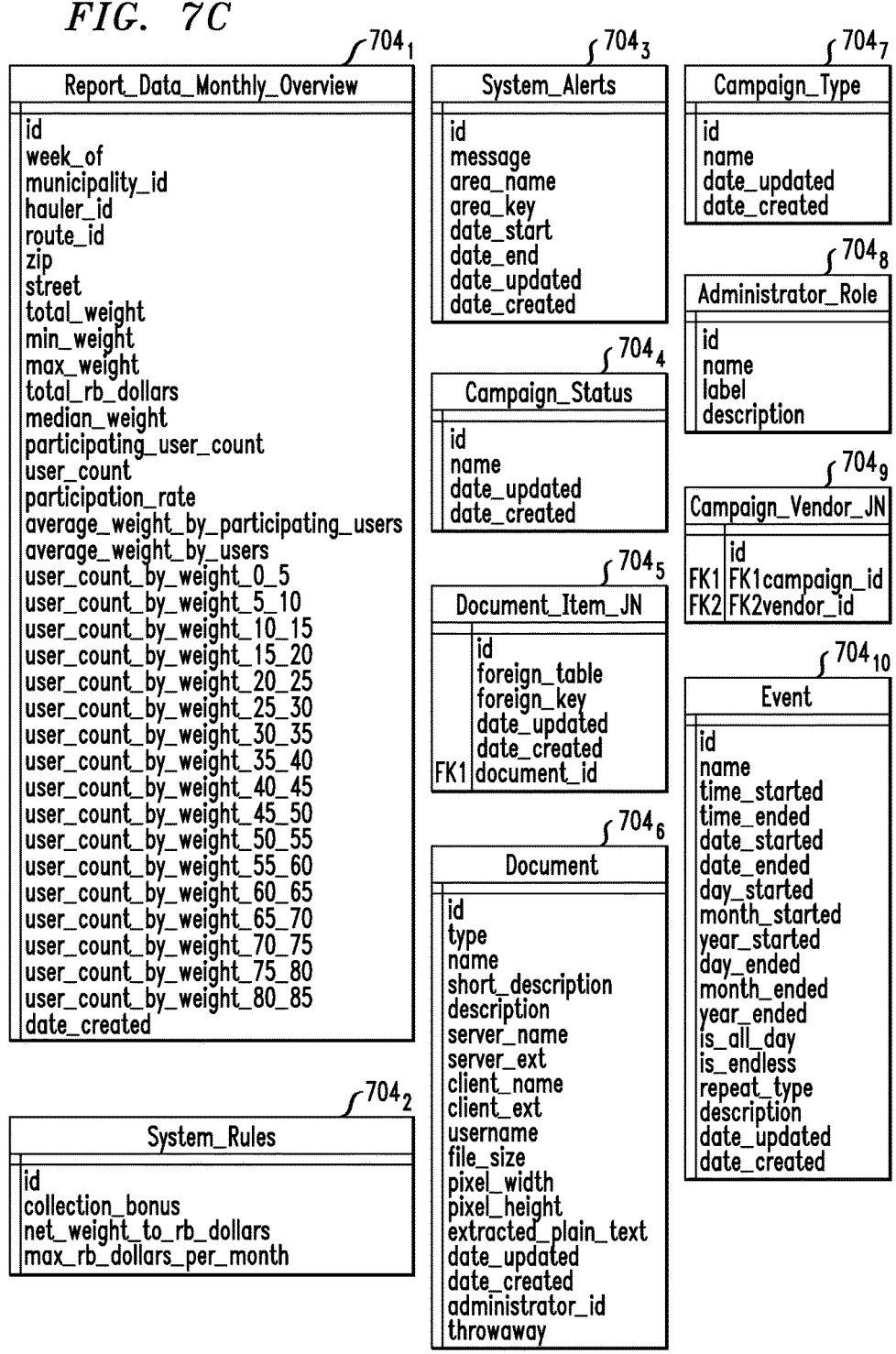
Figure 7E:
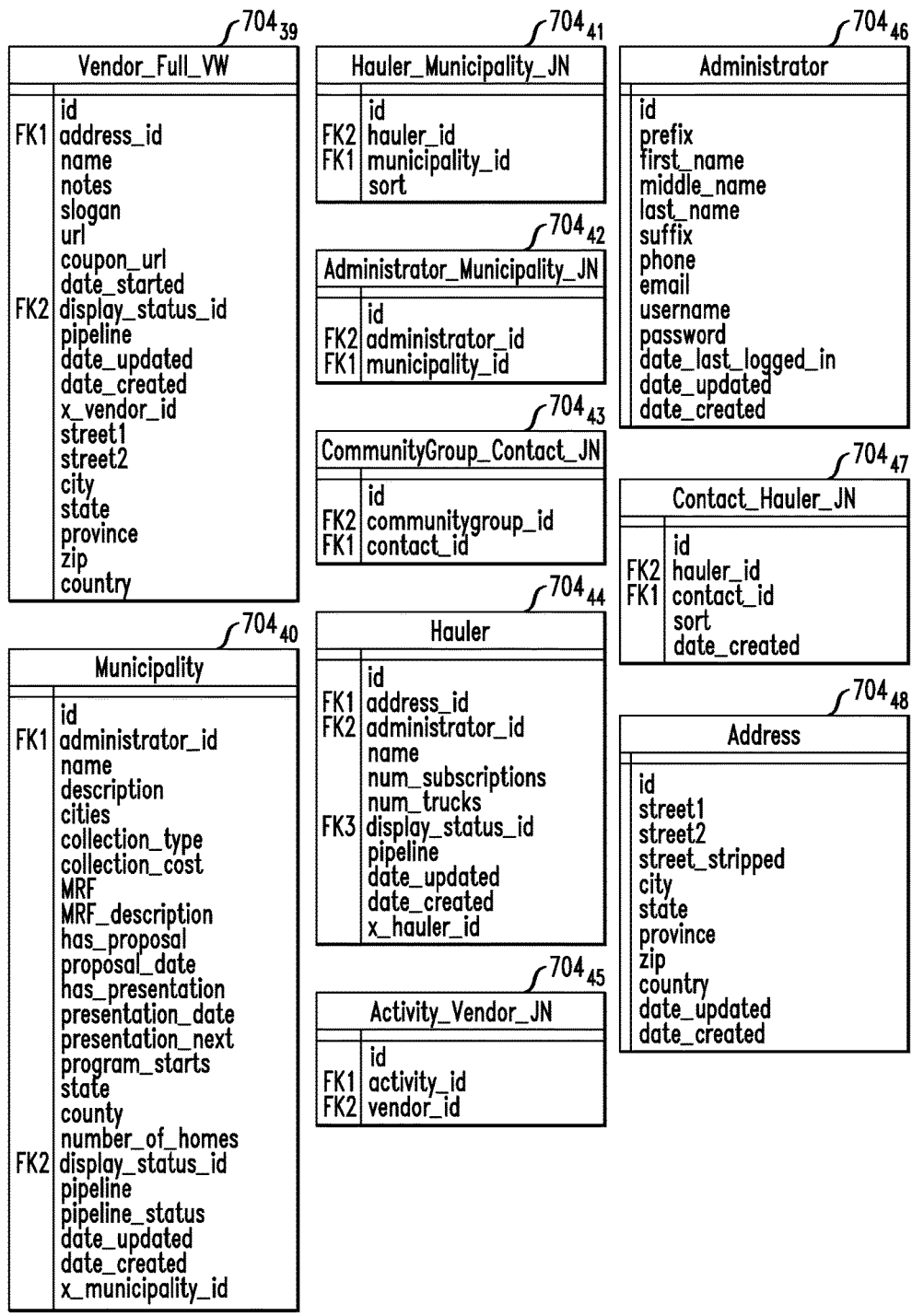
Figure 7F:
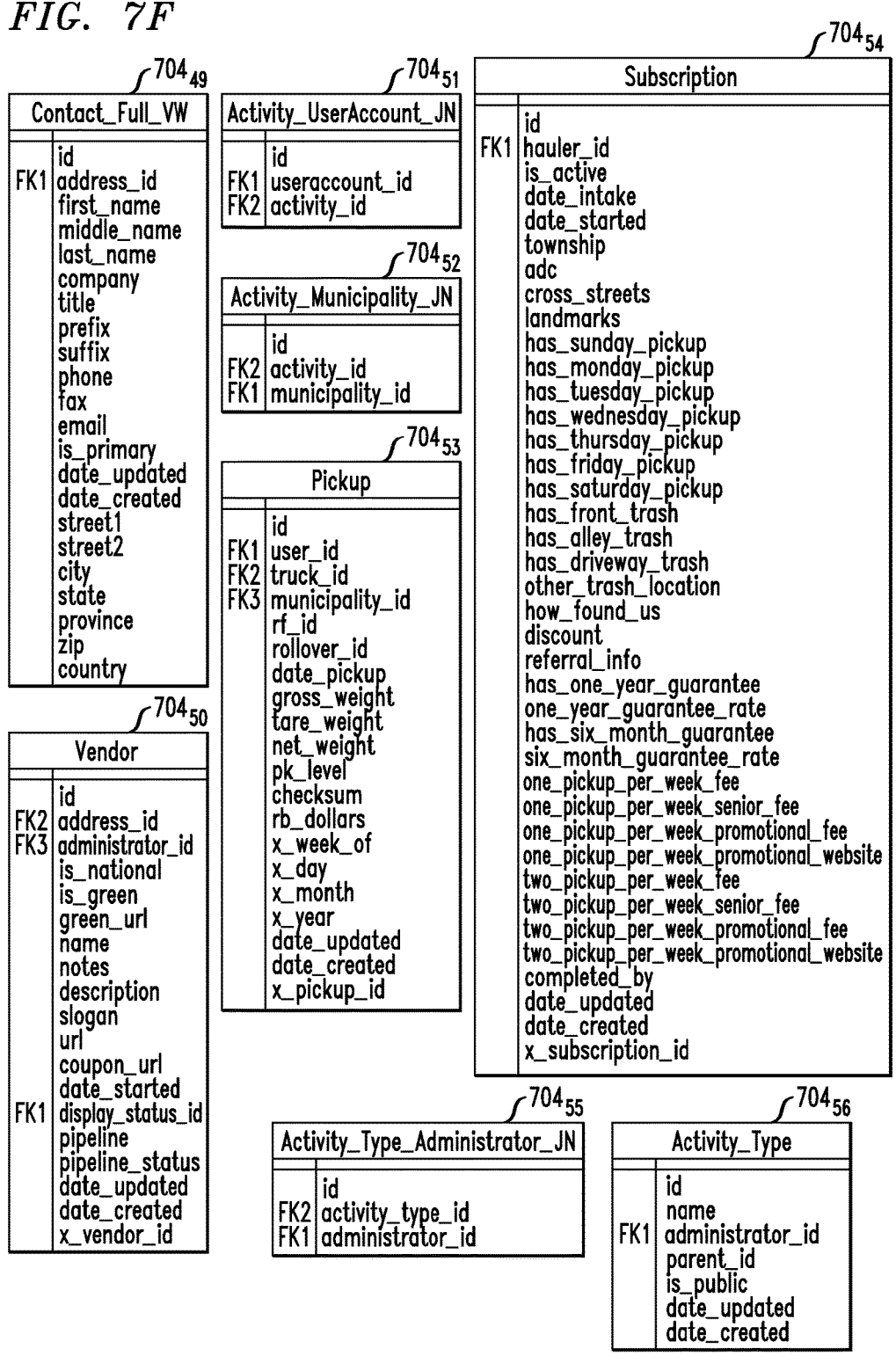

FIG. 6 is a block diagram illustrating an example of a system 600 for managing a recycling entity. The system 600 includes an administrator-user device 602 and a host 604. The administrator-user device 602 and host 604 may be communicatively coupled together via the network 116. This way, the administrator-user device 602 and host 604 may exchange information via one or more communications carried over the network 116.

The host 604 is similar to the host 100 of FIG. 1, except as described herein below. Like the host 106, the host 604 includes the host server 138, and in turn, the processor 140, the memory 142 and the I/O device 144.

In addition to the various software packages, such as operating system 148, application-server software 150 and web-server software 152, and the records $136_i$-$136_n$, the memory 142 may store database software 606 and a database 608.

The database 608 may include a number of records 610 into which the entity data (FIG. 5), the recycling data (FIG. 5), the resource data (FIG. 5) and/or other information (collectively "management information") may be parsed and stored. The database software 606 may include and/or employ one or more database management systems ("DBMS"), such as any of an Oracle, DB2, Microsoft Access, Microsoft SQL Server, Postgres, MySQL, 4th Dimension, FileMaker and Alpha Five DBMS, and the like. The DBMS is operable to query the database 608, parse the management information into the records 610, execute rules for sorting the management information parsed into the records 610, execute rules for performing operations (e.g., mathematical, statistical, logical, etc., operations) on the management information parsed into the records 610, generate reports as a function of the management information and the rules, and the like.

In addition, the database software 606 and the database 608 together may include, define or otherwise form one or more models for determining an allocation of resources associated with carrying out recycling of deposited material of the entities. An example of one of the models is described in more detail below with respect to FIGS. 7A-7F.

FIGS. 7A-7F are block diagrams illustrating an example of a model 700 for determining an allocation resources associated with carrying out recycling of deposited material of one or more entities. The model 700 includes a data-flow map 702 (FIG. 7A-7B) and a plurality of records $704_1$-$704_{66}$ (FIG. 7A-7F).

The data-flow map 702 maps flows of data input into and/or output from each of the records $704_1$-$704_{66}$ (if any). To facilitate this, the data-flow map 702 is structured as a table having sixty six rows; each of which includes four associated entries respectively separated into four columns, namely, column 706 labeled "Record #," column 708 labeled "Record Name," column 710 labeled "Input," and column 712 labeled "Output."

The entries of the first column 706 are populated with identifications of the records $704_1$-$704_{66}$, respectively. The entries of the second column 708 are populated with names associated with the records $704_1$-$704_{66}$, respectively.

Each of the entries of the third column 710 is populated with an "x", a reference or a plurality of references. For example, entry 714 includes an "x". This means that record $704_1$ does not have an input. Similarly, the entries in the third column populated with the "x" means that the corresponding records $704_1$-$704_{66}$ do not have an input.

As another example, entry 716 includes a reference "66." This means that record $704_4$ has an input and the input is adapted to receive data from the record $704_{66}$ Like the entry 716, each of the entries in the third column populated with the single reference means that the records $704_1$-$704_{66}$ having such reference has an input and the input is adapted to receive input from the record that corresponds to such reference.

The entry 718 includes a first reference "25" and a second reference "30". This means that record $704_{29}$ has two inputs; one input adapted to receive data from record $704_{25}$ and another input adapted to receive data from record $704_{30}$. Like the entry 718, each of the entries in the third column populated with the multiple references means that the records $704_1$-$704_{66}$ having such reference has a corresponding number of inputs and such inputs are adapted to receive data from the records that correspond to such references.

Like the entries in the third column 710, each of the entries in the fourth column 712 is populated with an "x", a reference or a plurality of references. Each of the "x", reference and plurality of reference has the same meaning as described above, except that they refer to outputs (as opposed to inputs) of the records $704_1$-$704_{66}$.

Each of the records $704_1$-$704_{66}$ (FIGS. 7C-7E) delineates the management information parsed, transferred or otherwise entered into such record. In addition, each of the records $704_1$-$704_{66}$ shown in the data-flow map 702 having an input and/or output includes respective inputs and outputs.

Referring back to FIG. 6, the database software 606 is operable to apply the management information to one or more of the models (e.g., model 700 of FIG. 7) to form one or more output records 612. These output records 612 include information that may be used to allocate the resources associated with carrying out recycling of deposited material of the entities. In addition to forming the output records 112, the database software 602 may be operable to interface with the web-server software 152 to allow manipulation of the database 608 via one or more web pages available to the administrator-user device 602 ("admin webpages") over the network 116.

The administrator-user device 602 may be, for example, any of or any combination of a personal computer; a portable computer, a handheld computer; a mobile phone, a digital assistant, a personal digital assistant, a cellular phone, a smart phone, a pager, a digital tablet, a laptop computer, an Internet appliance and the like. In general, the administrator-user device 100 may include a processor-based platform that operates on any suitable operating system, such as Microsoft® Windows®, Linux and/or Symbian; and that is capable of executing software.

The administrator-user device 602 may, however, include a large number of elements; many of which are not shown in FIG. 6 for simplicity of exposition. The administrator-user device 602 includes elements similar to the user device 107 and/or the data acquisition unit 112 of FIG. 1, except as described herein below. The administrator-user device 602 may be formed in a single unitary device and concentrated on a single server, client, peer or other type node. Alternatively, the administrator-user device 602 may be formed from one or more separate devices, and as such, may be distributed among a number of server, client, peer or other type nodes. In addition, the administrator-user device 602 may be scalable.

As shown, the administrator-user device 602 may include a processing platform 614 that is operable to control, manipulate or otherwise interact with a monitor 616 and/or an I/O device 618, via respective couplings. The processing platform 614, the monitor 616 and the I/O device 618 include elements similar to or the same as the processing platform 118, the monitor 120 and the I/O device 122 of the data acquisition unit 112, and as such, the details of such elements are not reproduced here for simplicity of exposition.

The administrator-user device 602 is operable to form a user interface through which an administrator can access the admin webpages provided by the web-server software 152. To facilitate this, the user interface may be communicatively coupled with the host server 138 via the network 116. The user interface may be, for example, a graphical-user interface that is operable execute a web browser application for rendering on the monitor 616 the admin webpages.

FIG. 8 is a flow diagram illustrating an example of a flow 800 for managing a recycling entity. For convenience, the flow 800 is described with reference to the system 600 of FIG. 6. The flow 800, however, may be carried out using other architectures as well.

The flow 800 starts at termination block 802. After termination block 802, the flow 800 may transition to process block 804. At process block 804, the database software 606 acquires, parses and/or stores the management data in the records 612. This may include the database software 606 acquiring, parsing and/or storing the entity data, the recycling data, the resource data and/or other information in the records 612.

The entity and recycling data may be acquired from as described above with reference to FIGS. 1, 2, 3A-3D, 4, 5, and 6. The entity and recycling data may be acquired in other ways as well.

Like the entity and recycling data, the resource data may be acquired from as described above with reference to FIGS. 1, 2, 3A-3D, 4, 5, and 6. Alternatively, the resource data and other portions of the management data may be acquired as follows.

The administrator, via the administrator-user device 602 executing a web browser, may log on to the host device 604. To log on, the administrator may have to substantiate his or her identity (e.g., by using an authorized user account and password) before receiving authorization to access the admin webpages rendered by web-server software 150. After logging in, the administrator may navigate the admin webpages and enter in, search for, select and/or otherwise manipulate the admin webpages to cause the web-server software 150 to acquire the resource data and other portions of the management data. Once acquired, the web-server software 150 passes the acquired management data to the database software 606. The database software 606, in turn, parses and stores the acquired management data in one or more of the records 612.

Like the entity and recycling data, the resource data and other portions of the management data may be acquired in other ways as well. After process block 804, the flow 800 may transition to process block 806.

At process block 806, the database software 606 applies the management data to one or more of the models for determining an allocation of the resources so as to form the output record 612. The database software 606, for example, may apply the management data to the model 700. As such, the database software 606 may, in accordance with the data-flow map 702 and the records $704_1$-$704_{66}$, query such records, parse the management information into the records $704_1$-$704_{66}$, execute the rules for sorting the management information parsed into the records $704_1$-$704_{66}$, execute the rules for performing operations (e.g., mathematical, statistical, logical, etc., operations) on the management information parsed into the records $704_1$-$704_{66}$, generate the output record 612 as a function of the management information and the rules, and the like. The database software 606 may carry out process block 806 in other ways as well.

After process block 806, the flow 800 may transition to process block 808. At process block 808, the database software 606 generates, as a function of the output record, one or more reports for allocating the resources. In addition, the database software 606 may makes the reports available to the web-server software 150. The web-server software 150, in turn, may generate admin webpages, which may be accessed by via the administrator-user device 602.

After process block 808, the flow 800 may transition to termination block 810, at which point the flow 800 terminates. Alternatively, the flow 800 may be repeated periodically, in continuous fashion, or upon being triggered as a result of a condition, such as a command or trigger. As another alternative, the process block 806 and/or process block 808 may be repeated periodically, in continuous fashion, or upon being triggered as a result of a condition.

Conclusion

Variations of the apparatus and method described above are possible without departing from the scope of the invention. For instance, in the examples described above, controllers and other devices containing processors are noted. These devices may contain at least one Central Processing Unit ("CPU") and a memory. In accordance with the practices of persons skilled in the art of computer programming, reference to acts and symbolic representations of operations or instructions may be performed by the various CPUs and memories. Such acts and operations or instructions may be referred to as being "executed," "computer executed" or "CPU executed."

One of ordinary skill in the art will appreciate that the acts and symbolically represented operations or instructions include the manipulation of electrical signals by the CPU. An electrical system represents data bits that can cause a resulting transformation or reduction of the electrical signals and the maintenance of data bits at memory locations in a memory system to thereby reconfigure or otherwise alter the CPU's operation, as well as other processing of signals. The memory locations where data bits are maintained are physical locations that have particular electrical, magnetic, optical, or organic properties corresponding to or representative of the data bits. It should be understood that the exemplary embodiments are not limited to the above-mentioned platforms or CPUs and that other platforms and CPUs may support the described methods.

The data bits may also be maintained on a computer readable medium including magnetic disks, optical disks, and any other volatile (e.g., Random Access Memory ("RAM")) or non-volatile (e.g., Read-Only Memory ("ROM")) mass storage system readable by the CPU. The computer readable medium may include cooperating or interconnected computer readable medium, which exist exclusively on the processing system or are distributed among multiple interconnected processing systems that may be local or remote to the processing system. It should be understood that the examples are not limited to the above-mentioned memories and that other platforms and memories may support the described methods.

In view of the wide variety of embodiments that can be applied, it should be understood that the illustrated examples are exemplary only, and should not be taken as limiting the scope of the following claims. Further, the claims should not be read as limited to the described order or elements unless stated to that effect. In addition, use of the term "means" in any claim is intended to invoke 35 U.S.C. § 112, ¶6, and any claim without the word "means" is not so intended.

What is claimed is:

1. A method of allocating recyclable material collected at a plurality of recycling locations from one or more recycling containers, the recyclable material is deposited in the one or more recycling containers by a respective one of a plurality of recycling entities associated with the respective ones of the plurality of recycling locations and the one or more recycling containers, the method comprising steps of:
    marking each of the one or more recycling containers with a machine readable identification providing information about the associated recycling locations, recycling entities, and a type of the recyclable material inside the one or more recycling containers,
    wherein the machine readable identification enables tracking of the provided information for allocating the recyclable material and is selected from at least a RFID, bar-code, magnetic-strip, and decipherable distinctive features selected from at least one of alphanumeric and color markings;
    providing a pickup vehicle adapted for transferring and receiving the deposited recyclable material from the one or more recycling containers;
    affixing to the pickup vehicle a load determining device;
    installing on the pickup vehicle a data acquisition unit communicatively coupled to a network and the load determining device,
    wherein the data acquisition unit comprising a processor and one or more sensors including a machine readable identification reader,
    wherein the machine readable identification reader is selected from one of the reader affixed to the pickup vehicle, a hand held scanner, and a peripheral I/O device;
    obtaining, by the processor, via the machine readable identification reader from each of the one or more recycling containers at the plurality of recycling locations information including an identity of each respective recycling entity, and description of the recyclable material, and from the load-determining device, a quantifiable measure of the described recyclable material;
    determining, by the processor, a value associated with the obtained quantifiable measure, wherein the value is based, at least in part, on one of a known value, a seasonally corrected value, an amount, an item count, and a financial offer by one of more participating retailers for the recyclable material; and
    crediting, by the processor, with the determined value to an account of the respective recycling entity; and
    transforming, by the processor, the credited value into redeemable notes.

2. The method of claim 1, wherein the machine readable identification included on each container comprises an identification tag.

3. The method of claim 1, wherein the distinctive features are decipherable by a pickup vehicle operator.

4. The method of claim 3, wherein the hand held scanner is used by the pickup vehicle operator, and the peripheral I/O device is connected to the processor.

5. The method of claim 1, wherein the quantifiable measure of the recyclable material deposited in the container is obtained by at least one of the load-determining device and by counting items of the recyclable material deposited in the container.

6. The method of claim 1, further comprising a step of redeeming, by the recycling entity, at least a portion of the redeemable notes at the participating retailers for at least one of goods, services, coupons for goods and/or services, and discounts for goods and/or services.

7. The method of claim 6, wherein the redeemable notes are vouchers spendable at the participating retailers or donated, wherein the vouchers are ordered and delivered by any one of by mail, email and other types of communication.

8. The method of claim 1, further comprising a step of reporting any of participation rates of the plurality of recycling entities and averages, and recycling rates at the recycling locations and averages for calendar periods selected at least weekly, monthly, quarterly, and yearly, the obtained information regarding the recycling entity, a subset of the plurality of recycling locations identified by one of a street name, a neighborhood, a community, a township, a county, a city and a state.

9. The method of claim 8, further comprising a step of determining a capacity and routes of the pickup vehicle and times and days and frequency that the pickup vehicle is sent on the route to obtain the recyclable material.

10. A system for allocating recyclable material collected at a plurality of recycling locations from one or more recycling containers, the recyclable material is deposited in the one or more recycling containers by a respective one of a plurality of recycling entities associated with the respective ones of the plurality of recycling locations and the one or more recycling containers, the system comprising:
    a machine readable identification marking each of the one or more recycling containers, the machine readable identification providing information about the associated recycling locations, recycling entities, and a type of the recyclable material inside the one or more recycling containers,
    wherein the machine readable identification enables tracking of the provided information for allocating the recyclable material and is selected from at least a RFID, bar-code, magnetic-strip, and decipherable distinctive features selected from at least one of alphanumeric and color markings;
    a pickup vehicle adapted for transferring and receiving the deposited recyclable material from the one or more recycling containers;
    a load determining device affixing the pickup vehicle; and
    a data acquisition unit, installing on the pickup vehicle, and communicatively coupled to a network, the data acquisition unit comprising a processor and one or more sensors including a machine readable identification reader, wherein the machine readable identification reader is selected from one of the reader affixed to the pickup vehicle, a hand held scanner, and a peripheral I/O device, the processor is configured to:
  obtain, via the machine readable identification reader from each of the one or more recycling containers at the plurality of recycling locations information including an identity of each respective recycling entity, a description of the recyclable material, and from the load-determining device, a quantifiable measure of the described recyclable material;
  determine a value associated with the obtained quantifiable measure of the recyclable material, wherein the value is based, at least in part, on one of a known value, a seasonally corrected value, an amount, an item count, and a financial offer by one of more participating retailers for the recyclable material;
  credit the determined value to an account of the respective recycling entity; and
  transform the credited value into redeemable notes.

11. The system of claim 10, wherein the machine readable identification included on each container comprises an identification tag.

12. The system of claim 11, wherein the distinctive features are decipherable by a pickup vehicle operator.

13. The system of claim 12, wherein the hand held scanner is used by the pickup vehicle operator, and the peripheral I/O device is connected to the processor.

14. The system of claim 10, wherein the quantifiable measure of the recyclable material deposited in the container is obtained by at least one of the load-determining device and by counting items of the recyclable material deposited in the container.

15. The system of claim 10, wherein the recycling entity can redeem at least a portion of the redeemable notes at the participating retailers for at least one of goods, services, coupons for goods and/or services, and discounts for goods and/or services.

16. The system of claim 15, wherein the redeemable notes are vouchers spendable at the participating retailers or donated, wherein the vouchers are ordered and delivered by any one of by mail, email and other types of communication.

17. The system of claim 10, wherein the processor is further configured to report any of participation rates of the plurality of recycling entities and averages, and recycling rates at the recycling locations and averages for calendar periods selected at least weekly, monthly, quarterly, and yearly, the obtained information regarding the recycling entity, a subset of the plurality of recycling locations identified by one of a street name, a neighborhood, a community, a township, a county, a city and a state.

18. The system of claim 17, wherein the processor is further configured to determine a capacity of and routes of the pickup vehicle and times and days and frequency that the pickup vehicle is sent on the route to obtain the recyclable material.

* * * * *